(12) United States Patent
Ederer et al.

(10) Patent No.: US 10,059,062 B2
(45) Date of Patent: Aug. 28, 2018

(54) DEVICE FOR PRODUCING THREE-DIMENSIONAL MODELS WITH SPECIAL BUILDING PLATFORMS AND DRIVE SYSTEMS

(71) Applicant: Voxeljet AG, Friedberg (DE)

(72) Inventors: Ingo Ederer, Geltendorf (DE); Andreas Dominik Hartmann, Stadtbergen (DE)

(73) Assignee: VOXELJET AG, Friedberg (DE)

( * ) Notice: Subject to any disclaimer, the term of this patent is extended or adjusted under 35 U.S.C. 154(b) by 722 days.

(21) Appl. No.: 14/400,957

(22) PCT Filed: May 17, 2013

(86) PCT No.: PCT/DE2013/000271
§ 371 (c)(1),
(2) Date: Mar. 13, 2015

(87) PCT Pub. No.: WO2013/174361
PCT Pub. Date: Nov. 28, 2013

(65) Prior Publication Data
US 2015/0224718 A1    Aug. 13, 2015

(30) Foreign Application Priority Data
May 25, 2012 (DE) .................. 10 2012 010 272

(51) Int. Cl.
*B29C 67/00* (2017.01)
*B29C 64/141* (2017.01)
(Continued)

(52) U.S. Cl.
CPC ........ *B29C 67/0092* (2013.01); *B29C 64/141* (2017.08); *B29C 64/153* (2017.08);
(Continued)

(58) Field of Classification Search
None
See application file for complete search history.

(56) References Cited

U.S. PATENT DOCUMENTS 3,850,213 A * 11/1974 Keaton ................... B27D 3/04
100/154
3,913,503 A    10/1975 Becker
(Continued)

FOREIGN PATENT DOCUMENTS

AU      720255 B2    5/2000
DE      3221357 A1    12/1983
(Continued)

OTHER PUBLICATIONS

US 4,937,420, 06/1990, Deckard (withdrawn)
(Continued)

*Primary Examiner* — Joseph A Miller, Jr.
(74) *Attorney, Agent, or Firm* — The Dobrusin Law Firm, P.C.

(57) ABSTRACT

The invention relates to a device for producing three-dimensional models in a continuous process, comprising a build surface which has a first end in the direction of movement and a second end in the direction of movement, at least one dosing device and at least one solidification unit, characterized in that the build surface is designed to transport heavy components, and the components are transportable over the build surface essentially without distortion, and also comprising a method therefor.

18 Claims, 34 Drawing Sheets

(51) Int. Cl.
  *B29C 64/153* (2017.01)
  *B29C 64/40* (2017.01)
  *B22F 3/105* (2006.01)
  *B33Y 10/00* (2015.01)
  *B33Y 30/00* (2015.01)
  *B29K 103/00* (2006.01)
  *B29K 105/00* (2006.01)

(52) U.S. Cl.
  CPC ...... *B29C 64/40* (2017.08); *B22F 2003/1056* (2013.01); *B29K 2103/00* (2013.01); *B29K 2105/251* (2013.01); *B33Y 10/00* (2014.12); *B33Y 30/00* (2014.12); *Y02P 10/295* (2015.11)

(56) References Cited

U.S. PATENT DOCUMENTS

| | | |
|---|---|---|
| 4,247,508 A | 1/1981 | Housholder |
| 4,575,330 A | 3/1986 | Hull |
| 4,591,402 A | 5/1986 | Evans et al. |
| 4,600,733 A | 7/1986 | Ohashi et al. |
| 4,665,492 A | 5/1987 | Masters |
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,076,869 A | 12/1991 | Bourell et al. |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,229,209 A | 7/1993 | Gharapetian et al. |
| 5,248,456 A | 8/1993 | Evans, Jr. et al. |
| 5,252,264 A | 10/1993 | Forderhase et al. |
| 5,263,130 A | 11/1993 | Pomerantz et al. |
| 5,269,982 A | 12/1993 | Brotz |
| 5,284,695 A | 2/1994 | Barlow et al. |
| 5,296,062 A | 3/1994 | Bourell et al. |
| 5,316,580 A | 5/1994 | Deckard |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,482,659 A | 1/1996 | Sauerhoefer |
| 5,490,962 A | 2/1996 | Cima et al. |
| 5,503,785 A | 4/1996 | Crump et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,721 A | 11/1996 | Gillette |
| 5,589,222 A | 12/1996 | Thometzek et al. |
| 5,597,589 A | 1/1997 | Deckard |
| 5,616,294 A | 4/1997 | Deckard |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,807,437 A | 9/1998 | Sachs et al. |
| 5,837,960 A | 11/1998 | Lewis et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 5,997,795 A | 12/1999 | Danforth |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,048,954 A | 4/2000 | Barlow et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,175,422 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,259,962 B1 | 7/2001 | Gothait |
| 6,270,335 B2 | 8/2001 | Leyden et al. |
| 6,305,769 B1 | 10/2001 | Thayer et al. |
| 6,316,060 B1 | 11/2001 | Elvidge et al. |
| 6,318,418 B1 | 11/2001 | Grossmann et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 | 7/2002 | Bredt et al. |
| 6,423,255 B1 | 7/2002 | Hoechsmann et al. |
| 6,460,979 B1 | 10/2002 | Heinzl et al. |
| 6,476,122 B1 | 11/2002 | Leyden |
| 6,485,831 B1 | 11/2002 | Fukushima et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,610,429 B2 | 8/2003 | Bredt et al. |
| 6,616,030 B2 | 9/2003 | Miller |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,742,456 B1 | 6/2004 | Kasperchik et al. |
| 6,764,636 B1 | 7/2004 | Allanic et al. |
| 6,827,988 B2 | 12/2004 | Krause et al. |

(56) References Cited

U.S. PATENT DOCUMENTS

| | | | |
|---|---|---|---|
| 6,830,643 B1 | 12/2004 | Hayes | |
| 6,838,035 B1 | 1/2005 | Ederer et al. | |
| 6,855,205 B2 | 2/2005 | McQuate et al. | |
| 6,896,839 B2 | 5/2005 | Kubo et al. | |
| 6,972,115 B1 | 12/2005 | Ballard | |
| 6,989,115 B2 | 1/2006 | Russell et al. | |
| 7,004,222 B2 | 2/2006 | Ederer et al. | |
| 7,037,382 B2 | 5/2006 | Davidson et al. | |
| 7,048,530 B2 | 5/2006 | Gaillard et al. | |
| 7,049,363 B2 | 5/2006 | Shen | |
| 7,087,109 B2 | 8/2006 | Bredt et al. | |
| 7,120,512 B2 | 10/2006 | Kramer et al. | |
| 7,137,431 B2 | 11/2006 | Ederer et al. | |
| 7,153,463 B2 | 12/2006 | Leuterer et al. | |
| 7,204,684 B2 | 4/2007 | Ederer et al. | |
| 7,220,380 B2 | 5/2007 | Farr et al. | |
| 7,291,002 B2 | 11/2007 | Russell et al. | |
| 7,296,990 B2 | 11/2007 | Devos et al. | |
| 7,332,537 B2 | 2/2008 | Bredt et al. | |
| 7,348,075 B2 | 3/2008 | Farr et al. | |
| 7,378,052 B2 | 5/2008 | Harryson | |
| 7,381,360 B2 | 6/2008 | Oriakhi et al. | |
| 7,387,359 B2 | 6/2008 | Hernandez et al. | |
| 7,402,330 B2 | 7/2008 | Pfeiffer et al. | |
| 7,431,987 B2 | 10/2008 | Pfeiffer et al. | |
| 7,435,072 B2 | 10/2008 | Collins et al. | |
| 7,435,368 B2 | 10/2008 | Davidson et al. | |
| 7,455,804 B2 | 11/2008 | Patel et al. | |
| 7,455,805 B2 | 11/2008 | Oriakhi et al. | |
| 7,497,977 B2 | 3/2009 | Nielsen et al. | |
| 7,531,117 B2 | 5/2009 | Ederer et al. | |
| 7,550,518 B2 | 6/2009 | Bredt et al. | |
| 7,578,958 B2 | 8/2009 | Patel et al. | |
| 7,597,835 B2 | 10/2009 | Marsac | |
| 7,641,461 B2 | 1/2010 | Khoshnevis | |
| 7,665,636 B2 | 2/2010 | Ederer et al. | |
| 7,722,802 B2 | 5/2010 | Pfeiffer et al. | |
| 7,807,077 B2 | 5/2010 | Ederer et al. | |
| 7,736,578 B2 | 6/2010 | Ederer et al. | |
| 7,748,971 B2 | 7/2010 | Hochsmann et al. | |
| 7,767,130 B2 | 8/2010 | Elsner et al. | |
| 7,795,349 B2 | 9/2010 | Bredt et al. | |
| 7,799,253 B2 | 9/2010 | Höchsmann et al. | |
| 7,879,393 B2 | 2/2011 | Ederer et al. | |
| 7,887,264 B2 | 2/2011 | Naunheimer et al. | |
| 7,927,539 B2 | 4/2011 | Ederer | |
| 8,020,604 B2 | 9/2011 | Hochsmann et al. | |
| 8,096,262 B2 | 1/2012 | Ederer et al. | |
| 8,186,415 B2 | 5/2012 | Marutani et al. | |
| 8,349,233 B2 | 1/2013 | Ederer et al. | |
| 8,506,870 B2 | 8/2013 | Hochsmann et al. | |
| 8,524,142 B2 | 9/2013 | Unkelmann et al. | |
| 8,574,485 B2 | 11/2013 | Kramer | |
| 8,715,832 B2 | 5/2014 | Ederer et al. | |
| 8,727,672 B2 | 5/2014 | Ederer et al. | |
| 8,741,194 B1 | 6/2014 | Ederer et al. | |
| 8,911,226 B2 | 12/2014 | Gunther et al. | |
| 8,951,033 B2 | 2/2015 | Höchsmann et al. | |
| 8,956,140 B2 | 2/2015 | Hartmann | |
| 8,956,144 B2 | 2/2015 | Grasegger et al. | |
| 8,992,205 B2 | 3/2015 | Ederer et al. | |
| 9,174,391 B2 | 11/2015 | Hartmann et al. | |
| 9,174,392 B2 | 11/2015 | Hartmann | |
| 9,242,413 B2 | 1/2016 | Hartmann et al. | |
| 9,321,934 B2 | 4/2016 | Mögele et al. | |
| 9,327,450 B2 | 5/2016 | Hein et al. | |
| 9,333,709 B2 | 5/2016 | Hartmann | |
| 9,358,701 B2 | 6/2016 | Gnuchtel et al. | |
| 2001/0045345 A1* | 11/2001 | Luigi | B65G 23/16 198/832 |
| 2001/0045678 A1 | 11/2001 | Kubo et al. | |
| 2001/0050031 A1 | 12/2001 | Bredt et al. | |
| 2002/0015783 A1 | 2/2002 | Harvey | |
| 2002/0016387 A1 | 2/2002 | Shen | |
| 2002/0026982 A1 | 3/2002 | Bredt et al. | |
| 2002/0079601 A1 | 6/2002 | Russell et al. | |
| 2002/0090410 A1 | 7/2002 | Tochimoto et al. | |
| 2002/0111707 A1 | 8/2002 | Li et al. | |
| 2002/0155254 A1 | 10/2002 | McQuate et al. | |
| 2002/0167100 A1 | 11/2002 | Moszner et al. | |
| 2003/0004599 A1 | 1/2003 | Herbak | |
| 2003/0065400 A1 | 4/2003 | Beam et al. | |
| 2003/0069638 A1 | 4/2003 | Barlow et al. | |
| 2003/0083771 A1 | 5/2003 | Schmidt | |
| 2003/0113729 A1 | 6/2003 | DaQuino et al. | |
| 2003/0114936 A1 | 6/2003 | Sherwood et al. | |
| 2004/0003738 A1 | 1/2004 | Imiolek et al. | |
| 2004/0012112 A1 | 1/2004 | Davidson et al. | |
| 2004/0025905 A1 | 2/2004 | Ederer et al. | |
| 2004/0026418 A1 | 2/2004 | Ederer et al. | |
| 2004/0035542 A1 | 2/2004 | Ederer et al. | |
| 2004/0036200 A1 | 2/2004 | Patel et al. | |
| 2004/0038009 A1 | 2/2004 | Leyden et al. | |
| 2004/0045941 A1 | 3/2004 | Herzog et al. | |
| 2004/0056378 A1 | 3/2004 | Bredt et al. | |
| 2004/0084814 A1 | 5/2004 | Boyd et al. | |
| 2004/0094058 A1 | 5/2004 | Kasperchik et al. | |
| 2004/0104515 A1 | 6/2004 | Swanson et al. | |
| 2004/0112523 A1 | 6/2004 | Crom | |
| 2004/0138336 A1 | 7/2004 | Bredt et al. | |
| 2004/0145088 A1 | 7/2004 | Patel et al. | |
| 2004/0170765 A1 | 9/2004 | Ederer et al. | |
| 2004/0187714 A1 | 9/2004 | Napadensky et al. | |
| 2004/0207123 A1 | 10/2004 | Patel et al. | |
| 2004/0239009 A1 | 12/2004 | Collins et al. | |
| 2005/0003189 A1 | 1/2005 | Bredt et al. | |
| 2005/0017386 A1 | 1/2005 | Harrysson | |
| 2005/0017394 A1 | 1/2005 | Hochsmann et al. | |
| 2005/0074511 A1 | 4/2005 | Oriakhi et al. | |
| 2005/0093194 A1 | 5/2005 | Oriakhi et al. | |
| 2005/0167872 A1 | 8/2005 | Ederer et al. | |
| 2005/0174407 A1 | 8/2005 | Johnson et al. | |
| 2005/0179167 A1 | 8/2005 | Hachikian | |
| 2005/0212163 A1 | 9/2005 | Bausinger et al. | |
| 2005/0218549 A1 | 10/2005 | Farr et al. | |
| 2005/0219942 A1 | 10/2005 | Wallgren | |
| 2005/0280185 A1 | 12/2005 | Russell et al. | |
| 2005/0283136 A1 | 12/2005 | Skarda | |
| 2006/0013659 A1 | 1/2006 | Pfeiffer et al. | |
| 2006/0105102 A1 | 5/2006 | Hochsmann et al. | |
| 2006/0108090 A1 | 5/2006 | Ederer et al. | |
| 2006/0159896 A1 | 7/2006 | Pfeifer et al. | |
| 2006/0176346 A1 | 8/2006 | Ederer et al. | |
| 2006/0208388 A1 | 9/2006 | Bredet et al. | |
| 2006/0237159 A1 | 10/2006 | Hochsmann | |
| 2006/0251535 A1 | 11/2006 | Pfeifer et al. | |
| 2006/0254467 A1 | 11/2006 | Farr et al. | |
| 2006/0257579 A1 | 11/2006 | Farr et al. | |
| 2007/0045891 A1 | 3/2007 | Martinoni | |
| 2007/0054143 A1 | 3/2007 | Otoshi | |
| 2007/0057412 A1 | 3/2007 | Weiskopf et al. | |
| 2007/0065397 A1 | 3/2007 | Ito et al. | |
| 2007/0126157 A1 | 6/2007 | Bredt | |
| 2007/0215020 A1 | 9/2007 | Miller | |
| 2007/0238056 A1 | 10/2007 | Baumann et al. | |
| 2008/0001331 A1 | 1/2008 | Ederer | |
| 2008/0018018 A1 | 1/2008 | Nielsen et al. | |
| 2008/0047628 A1 | 2/2008 | Davidson et al. | |
| 2008/0138515 A1 | 6/2008 | Williams | |
| 2008/0187711 A1 | 8/2008 | Alam et al. | |
| 2008/0233302 A1 | 9/2008 | Elsner | |
| 2008/0237933 A1 | 10/2008 | Hochsmann et al. | |
| 2008/0241404 A1 | 10/2008 | Allaman et al. | |
| 2008/0260945 A1 | 10/2008 | Ederer et al. | |
| 2008/0299321 A1 | 12/2008 | Ishihara | |
| 2009/0011066 A1 | 1/2009 | Davidson et al. | |
| 2009/0068376 A1 | 3/2009 | Philippi et al. | |
| 2009/0261497 A1 | 10/2009 | Ederer et al. | |
| 2010/0007062 A1 | 1/2010 | Larsson et al. | |
| 2010/0026743 A1 | 2/2010 | Van Thillo et al. | |
| 2010/0152865 A1 | 6/2010 | Jonsson et al. | |
| 2010/0212584 A1 | 8/2010 | Ederer et al. | |
| 2010/0207288 A1 | 9/2010 | Enrico | |
| 2010/0243123 A1 | 9/2010 | Ederer et al. | |

(56) References Cited

U.S. PATENT DOCUMENTS

| | | |
|---|---|---|
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2011/0308755 A1 | 12/2011 | Hochsmann |
| 2012/0046779 A1 | 2/2012 | Pax et al. |
| 2012/0094026 A1 | 4/2012 | Ederer et al. |
| 2012/0097258 A1 | 4/2012 | Hartmann |
| 2012/0113439 A1 | 5/2012 | Ederer |
| 2012/0126457 A1 | 5/2012 | Abe et al. |
| 2012/0189102 A1 | 7/2012 | Maurer, Jr. et al. |
| 2012/0291701 A1 | 11/2012 | Grasegger et al. |
| 2012/0329943 A1 | 12/2012 | Hicks et al. |
| 2013/0000549 A1 | 1/2013 | Hartmann et al. |
| 2013/0004610 A1 | 1/2013 | Hartmann et al. |
| 2013/0026680 A1* | 1/2013 | Ederer .................. B22F 3/105 264/401 |
| 2013/0029001 A1 | 1/2013 | Gunther et al. |
| 2013/0092082 A1 | 4/2013 | Ederer et al. |
| 2013/0157193 A1 | 6/2013 | Moritani et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0048980 A1 | 2/2014 | Crump et al. |
| 2014/0202381 A1 | 7/2014 | Ederer et al. |
| 2014/0202382 A1 | 7/2014 | Ederer |
| 2014/0212677 A1 | 7/2014 | Gnuchtel et al. |
| 2014/0227123 A1 | 8/2014 | Gunster et al. |
| 2014/0236339 A1 | 8/2014 | Fagan |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Hartmann |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0318251 A1 | 3/2016 | Ederer et al. |
| 2016/0107386 A1 | 4/2016 | Hartmann et al. |
| 2016/0114533 A1 | 4/2016 | Grassegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2017/0028630 A1 | 2/2017 | Ederer et al. |
| 2017/0050378 A1 | 2/2017 | Ederer |
| 2017/0050387 A1 | 2/2017 | Ederer |
| 2017/0106595 A1 | 4/2017 | Gunther et al. |
| 2017/0136524 A1 | 5/2017 | Ederer et al. |
| 2017/0151727 A1 | 6/2017 | Ederer et al. |
| 2017/0157852 A1 | 6/2017 | Ederer et al. |

FOREIGN PATENT DOCUMENTS

| | | |
|---|---|---|
| DE | 3930750 C2 | 3/1991 |
| DE | 4102260 A1 | 7/1992 |
| DE | 4305201 C1 | 4/1994 |
| DE | 4 325 573 | 2/1995 |
| DE | 29506204 U1 | 6/1995 |
| DE | 4440397 | 9/1995 |
| DE | 19525307 A1 | 1/1997 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 69634921 T2 | 12/2005 |
| DE | 201 22 639 U1 | 11/2006 |
| DE | 102006040305 A1 | 3/2007 |
| DE | 102006029298 A1 | 12/2007 |
| DE | 102007040755 A1 | 3/2009 |
| DE | 102007047326 A1 | 4/2009 |
| DE | 102009056696 A1 | 6/2011 |
| DE | 102010015451 A1 | 10/2011 |
| DE | 102011053205 A1 | 3/2013 |
| DE | 102015006363 A1 | 12/2016 |
| DE | 102015008860 A1 | 1/2017 |
| DE | 102015011503 A1 | 3/2017 |
| DE | 102015011790 A1 | 3/2017 |
| EP | 0361847 B1 | 4/1990 |
| EP | 1415792 | 5/2004 |
| EP | 1457590 A | 9/2004 |
| EP | 1381504 B1 | 8/2007 |
| GB | 2297516 A | 8/1996 |
| JP | S62275734 A | 11/1987 |
| JP | 2003136605 A | 5/2003 |
| JP | 2004082206 A | 3/2004 |
| JP | 2009202451 A | 9/2009 |
| SU | 821339 A1 | 4/1981 |
| WO | 01/40866 A2 | 6/2001 |
| WO | 2001/078969 A2 | 10/2001 |
| WO | 2004/014637 A1 | 2/2004 |
| WO | 2006/100166 A1 | 9/2006 |
| WO | 2008/049384 A1 | 5/2008 |
| WO | 2008061520 A2 | 5/2008 |
| WO | 2011063786 A1 | 6/2011 |
| WO | 2013075696 A1 | 5/2013 |
| WO | 2014090207 A1 | 6/2014 |
| WO | 2014166469 A1 | 10/2014 |
| WO | 2015078430 A1 | 6/2015 |
| WO | 2015081926 A1 | 6/2015 |
| WO | 2015085983 A2 | 6/2015 |
| WO | 2015090265 A1 | 6/2015 |
| WO | 2015090567 A1 | 6/2015 |
| WO | 2015096826 A1 | 7/2015 |
| WO | 2015149742 A1 | 10/2015 |
| WO | 2015180703 A1 | 12/2015 |
| WO | 2016019937 A1 | 2/2016 |
| WO | 2016019942 A1 | 2/2016 |
| WO | 2016058577 A1 | 4/2016 |
| WO | 2016095888 A1 | 6/2016 |
| WO | 2016101942 A1 | 6/2016 |
| WO | 2016146095 A1 | 9/2016 |

OTHER PUBLICATIONS

International Search Report, Application No. PCT/DE2013/000271, dated Oct. 8, 2013.

International Preliminary Report on Patentability and Translation of Written Opinion of the International Search Authority, Application No. PCT/DE2013/000271, dated Nov. 25, 2014.

Voxeljet's VXconcept—Continuous 3D printing for sand casting, You-Tube, Nov. 16, 2011, XP002713379, retrieved from the Internet: URL: http://www.youtube.com/watch?v=hgIrNXZjlxU retrieved on Sep. 23, 2013.

Screen shots of URL: http://www.youtube.com/watch?v=hgIrNXZjIxU taken in approximately 5 second intervals on Nov. 12, 2015.

Marcus et al., Solid Freedom Fabrication Proceedings, Nov. 1993.

Cima et al., "Computer-derived Microstructures by 3D Printing: Bio- and Structural Materials," SFF Symposium, Austin, TX, 1994.

Marcus, et al., Solid Freeform Fabrication Proceedings, Sep. 1995, p. 130-33.

Gebhart, Rapid Prototyping, pp. 118-119, 1996.

(56) References Cited

OTHER PUBLICATIONS

Feature Article—Rapid Tooling—Cast Resin and Sprayed Metal Tooling by Joel Segal, Apr. 2000.
EOS Operating Manual for Laser Sintering Machine with Brief Summary Feb. 22, 2005.
Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.
Sachs et al., "Three-Dimensional Printing: Rapid Tooling and Prototypes Directly from a CAD Model", Massachusetts Institute of Technology, pp. 143-151, Jan. 1990.
Williams, "Feasibility Study of Investment Casting Pattern Design by Means of Three Dimensional Printing", Department of Mechanical Engineering, abstract only; Sep. 25, 2001.
Armin Scharf, "Erster 3D-Endlosdrucker", zwomp.de, http://www.zwomp.de/2012/11/06/voxeljet-endlosdrucker/ dated Nov. 6, 2012.
Jacobs et al., 2005 SME Technical Paper, title "Are QuickCast Patterns Suitable for Limited Production?"
European Office Action, EP Application No. 13731276.5 dated Jan. 18, 2017.
Chinese Office Action, CN Application No. 201380027361.9 dated Jan. 27, 2016.
Chinese Second Office Action, C CN Application No. 201380027361.9 dated Aug. 10, 2016.
Chinese Third Office Action, CN Application No. 201380027361.9 dated Jan. 18, 2017.
Tang Nan and Mu Xiangyang, "Stepping Motor", *Computer Control Technology*, Aug. 31, 2009, p. 117.

\* cited by examiner

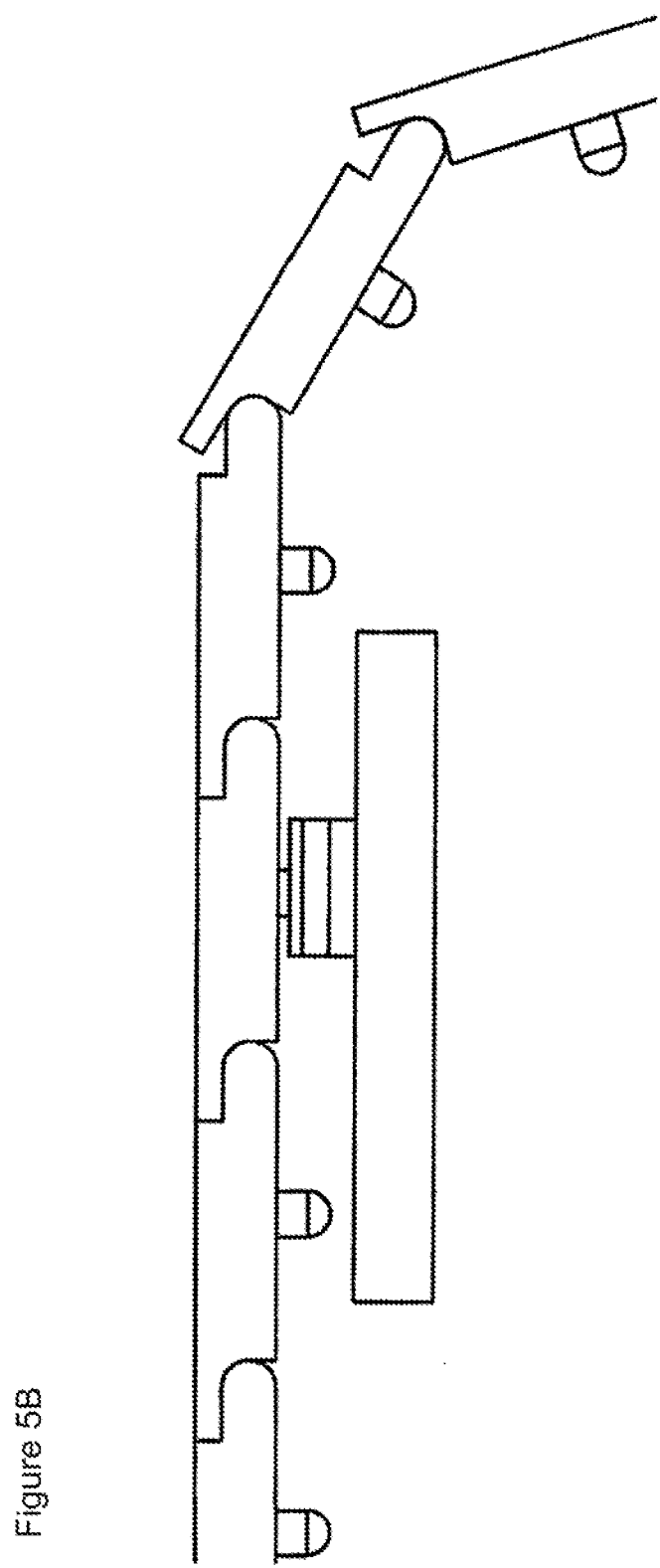

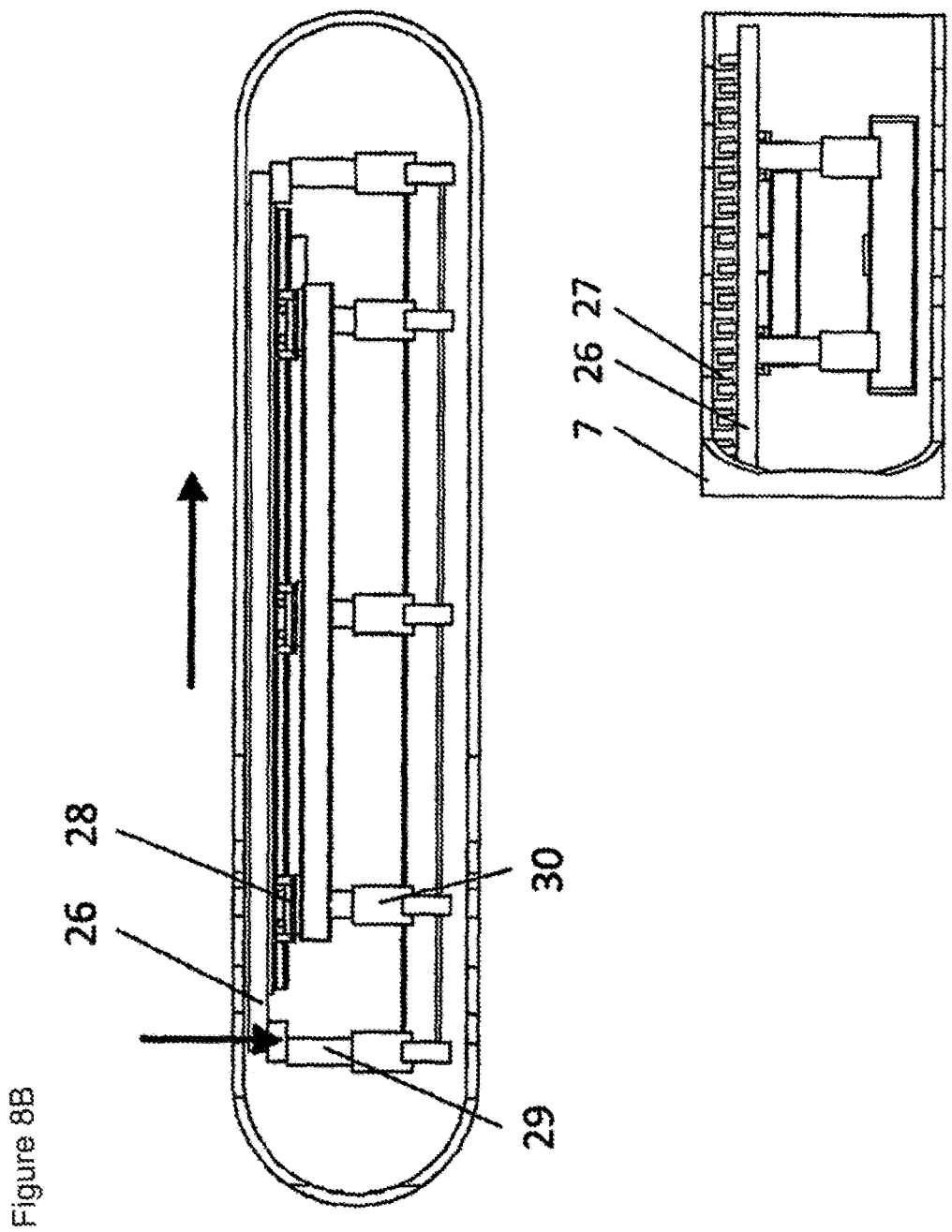

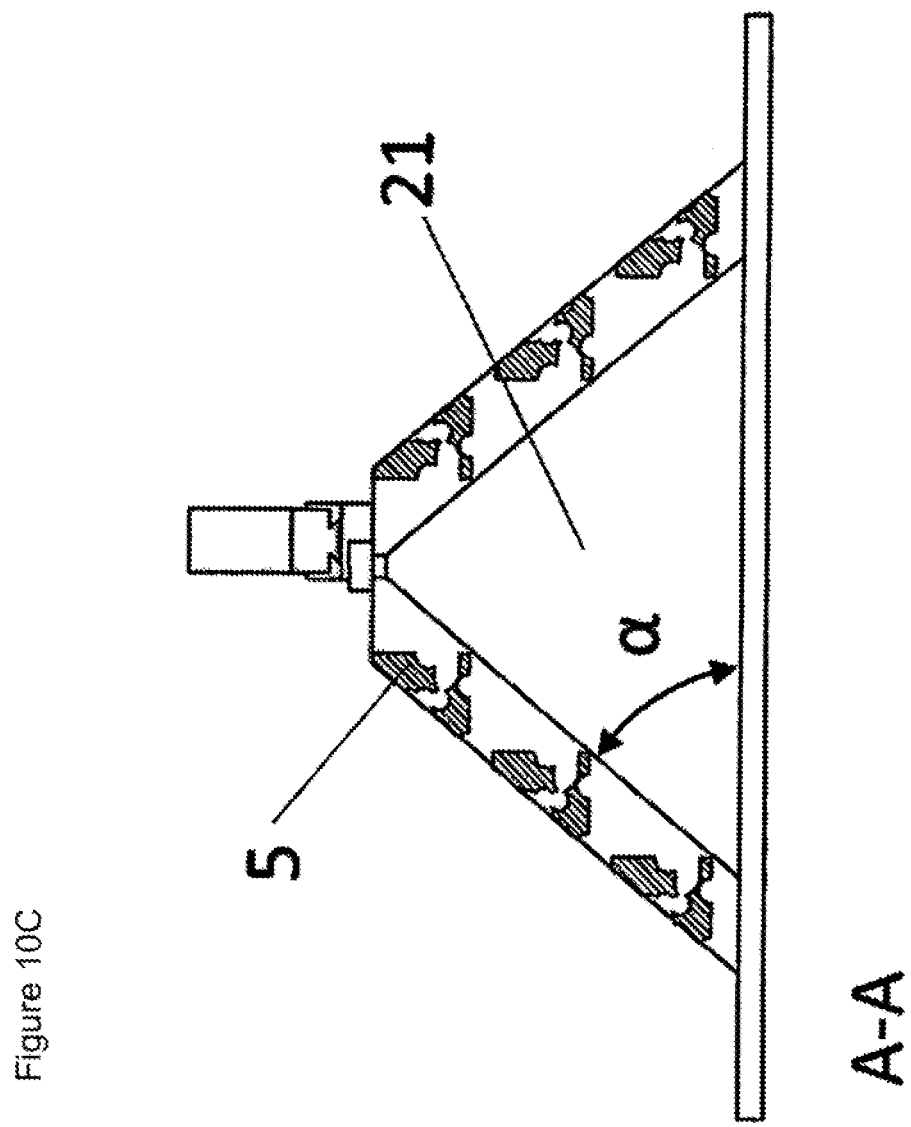

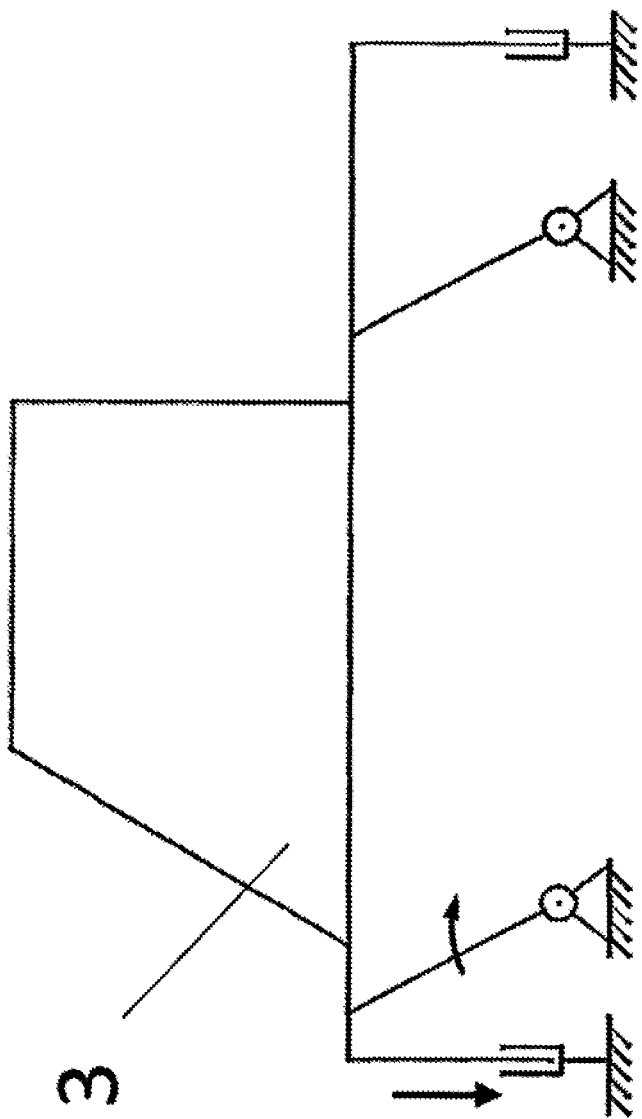

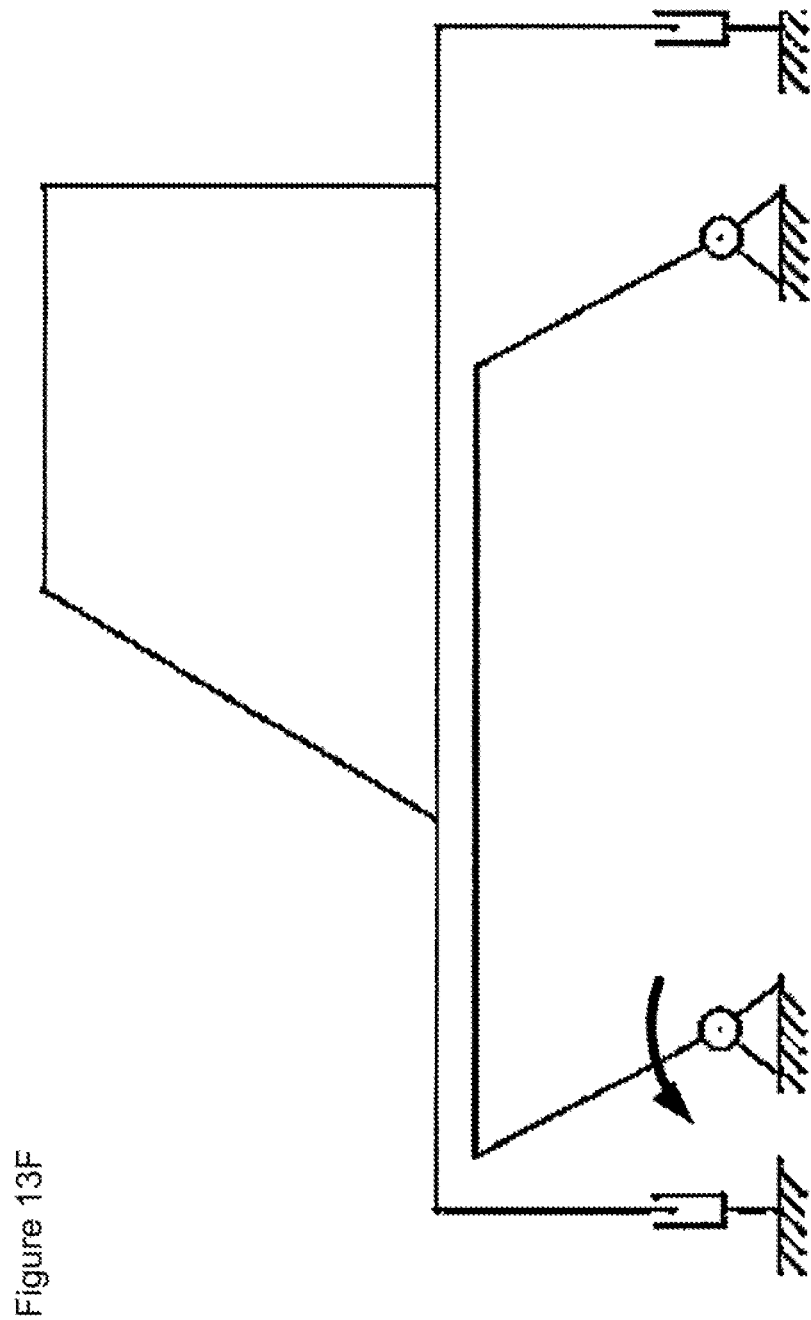

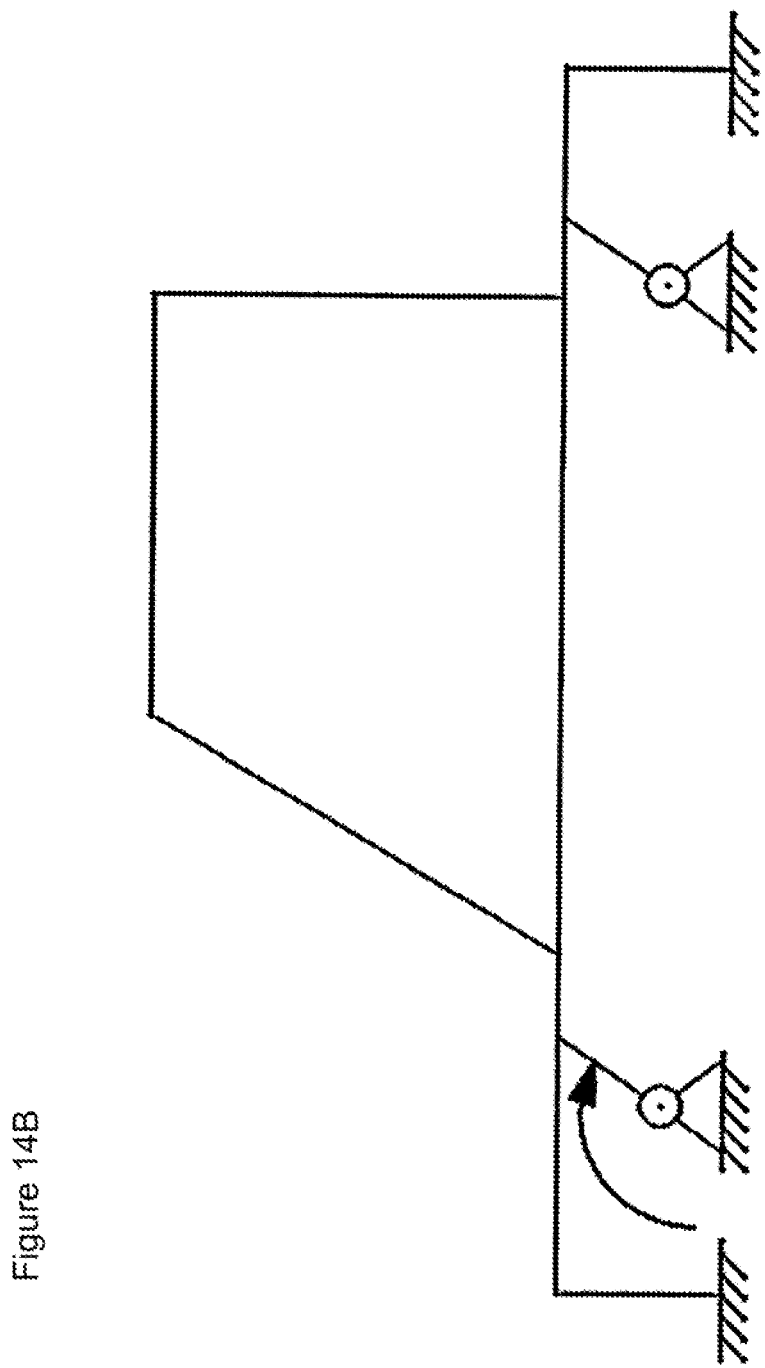

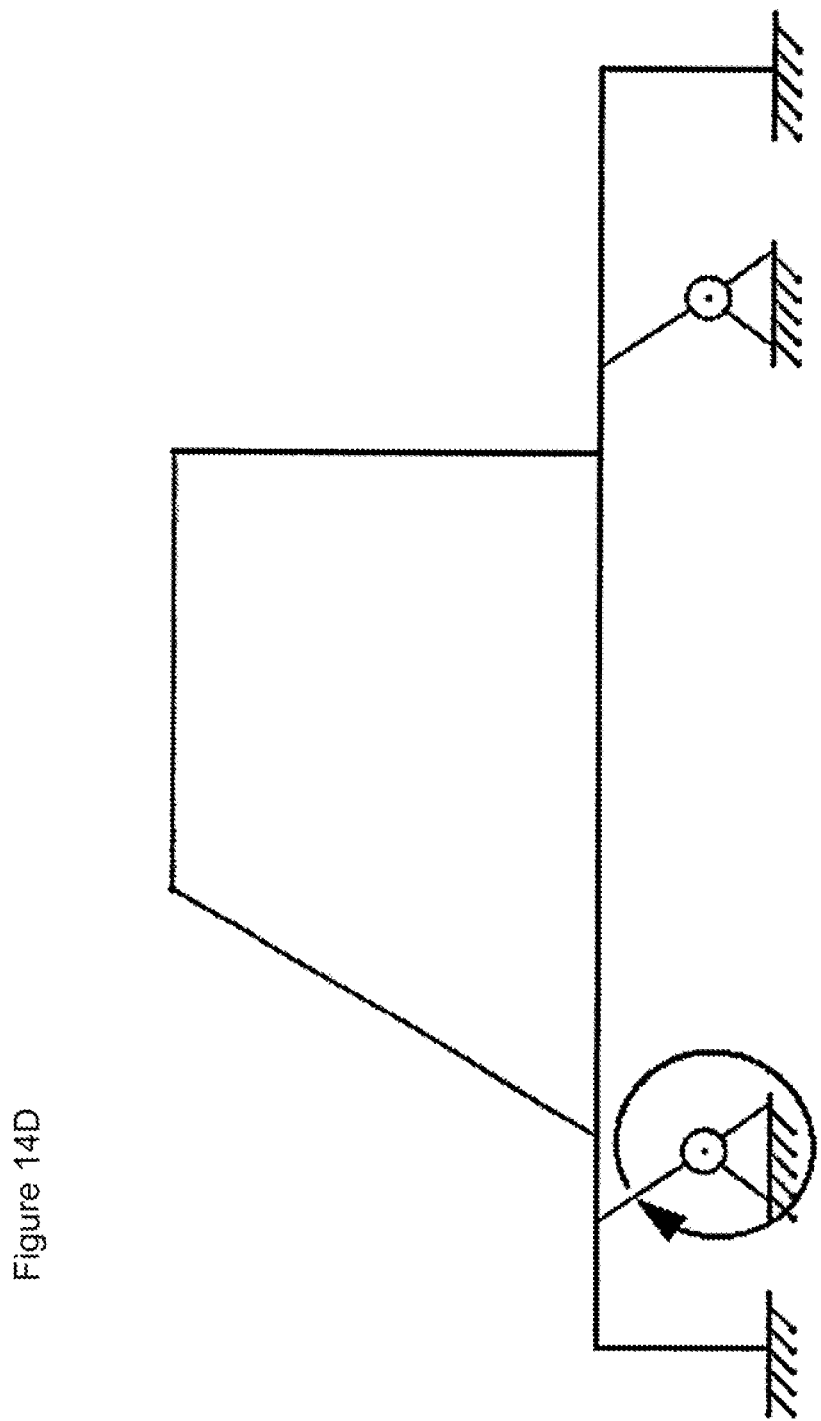

DEVICE FOR PRODUCING THREE-DIMENSIONAL MODELS WITH SPECIAL BUILDING PLATFORMS AND DRIVE SYSTEMS

BACKGROUND OF THE INVENTION

The present invention relates to a system for the continuous production of three-dimensional models on a horizontal transport device, using a layering technique.

PRIOR ART

In layering methods used today for producing three-dimensional objects based on computer data, methods are used in which a platform (building platform), which is movable at least in the vertical direction and which, if necessary, is surrounded by a container and thus forms a job box, is placed in an uppermost position at the beginning of the process. A build material, for example a substance in the form of particulate material in the case of 3D printing or laser sintering, is then applied in a thin layer over the entire area of this platform. In another step, the material is selectively bound with the aid of a physical or chemical solidification mechanism according to the desired component shape. This binding step may take place, for example, using adhesives, which may be printed with the aid of ink jet techniques. The platform is then lowered by one layer thickness, and a new layer of particulate material is applied.

These steps are repeated until the desired body is built, i.e., all necessary layers have been applied and solidified. The container is successively filled with particulate material during these steps, parts thereof being bound to the desired structural body, while the rest remains loose and is used during the building process as a support medium for overhanging parts of the object to be built.

After completing the layering process, following a waiting period which may be necessary, the loose particulate material may be extracted or removed in another manner and the desired object discharged.

It is possible in this case to produce components continuously using an endless, horizontal layer feed.

In conventional systems for building models in layers, the components are produced vertically in layers from top to bottom.

When the maximum build height of a system is reached, the building process must be stopped in order to subsequently remove the components in the system and thereby create space for a building process, or another build frame must be inserted with the aid of a changing system in order to be able to thereby start a new building process. As a result, the construction of components is limited with respect to size and productivity.

In the known "continuous 3D printing" method, the layer feed takes piece in the horizontal direction, e.g., on a continuous conveyor belt.

Gravity prevents a layer to be applied perpendicularly to the layer feed, which is why the individual layers are applied at an angle. The angle is selected in such a way that it is smaller than the specific angle of repose of the corresponding particulate material.

The layering process is followed by an enclosed conveyor line, whose length is adapted to the method-dependent hardening duration. At the end of the conveyor line, the finished components enter a removal area. There, the components are freed of unbound particle material and removed without having to interrupt the production of additional parts.

In the continuous method, different tools and methods may be used to feed the components, for example continuous conveyor belts are used.

Continuous conveyor belts are generally closed belts made of a flexible material (e.g., woven fabric) that is looped around a drum at each end to reverse the direction of travel. At least one of the two drums drives the conveyor belt. Between the drums, the belt must be pulled over a supporting surface to avoid sagging. Above a certain width of the conveyor belt or above a certain mass of the particulate material feedstock, the frictional engagement between the conveyor belt and the supporting surface is so great that stick/slip effects may occur, or the drive may fail completely.

Link conveyors are furthermore known, which are able to accommodate very high loads. Link conveyors of this type are driven in the same way as conveyor belts. A drive drum or return drum is located at each end of the closed link conveyor. If a link conveyor is driven in this manner, an uneven feed results. This is because the plates unwind in the manner of a polygon. At the same time, the bearing of the individual links may prove to be sensitive to contaminants. If the links do not ideally abut each other, build material may enter the space between two plates via the joints and impair the operation of the flexible connection. In addition, particulate material may be lost uncontrollably via the joint, which may result in defects in the particulate material feedstock and thus in the components.

Link conveyors are an additional option. Link conveyors are able to accommodate high loads and are driven in the same manner as conveyor belts. A drive drum or return drum is located at each end of the closed link conveyor. If a link conveyor is driven in this manner, an uneven feed results. This is because the plates unwind in the manner of a polygon. At the same time, the bearing of the individual links may prove to be sensitive to contaminants. If the links do not ideally abut each other, build material may enter the space between two plates via the joints and impair the operation of the flexible connection. In addition, particulate material may be lost uncontrollably via the joint, which may result in defects in the particulate material feedstock and thus in the components.

The use of individual plates which are fed in a feed unit from a magazine is also known. In this case, the build time is dependent on the number or length of the individual plates. Continuous building is possible only if the building platforms are automatically returned to the magazine at the end of the building process. This is technologically complex, since the plates must, among other things, be clean for reuse. The vibration-free and dense placement of a new plate has also proven to be difficult. The concept of this building device must furthermore be changed to the extent that the coater is no longer able to travel under the level of the build plane.

The known feeding means for use in a continuous process for building bulky and complex models (components) in layers are thus subject to a large number of problems. Up to now, no devices and methods are known which are suitable for producing large and heavy models and which avoid the disadvantages described above.

A need thus exists for providing a device and a method for building models in layers by means of which large and heavy components may be produced, preferably in the continuous process, and which are consistent with a preferably precise satisfaction of the requirements, or by means of which the disadvantages of the prior art may be at least improved or avoided entirely.

PREFERRED EMBODIMENTS OF THE INVENTION

The invention relates to a device for producing three-dimensional models, preferably in a continuous process, comprising a build surface which has a first end in the direction of movement and a second end in the direction of movement, at least one dosing device and at least one solidification unit, characterized in that the build surface is designed to transport heavy components, and the components are transportable over the build surface essentially without distortion. In preferred embodiments which provide a rotational operation, the first end is understood to be the start of the process, and the second end is understood to be the end of the process, or preferably the unpacking position or the unpacking operation.

The inventors have advantageously succeeded in providing drives which are suitable for producing bulky and heavy components, in particular in continuous processes, for building models in layers using inclined printing, and which facilitate precise production without distortion in compliance with the requirements.

The inventors thus have developed a device and a method, by means of which particularly heavy components may be precisely produced in the continuous layering method (inclined printing) and which avoid or at least significantly improve the disadvantages of the prior art. In one preferred embodiment, the work takes place in batches.

As illustrated above, different options exist for transporting the particulate material strand. However, the systems all have serious problems with regard to precision of the movement under heavy loads. A conveyor belt must thus be guided over at least two return rollers, the drive being reasonably integrated into the rear return roller in the conveyance direction. The movement precision of the belt would be highest in this location and correspondingly lowest at the other end, due to slackness in the belt. However, this is where the layering is carried out, i.e., the very place where the belt movement must be precise.

With the aid of the device according to the invention and the method according to the invention, it is now possible to move the feedstock completely forward and to achieve a distortion-free, precise feed when producing heaving components. Disadvantageous distortions due to slackness in the drive, which occur in known methods and systems used therein, are advantageously avoided with the aid of the invention. The precise production of heavy components by means of layering in the continuous process is made possible hereby.

In preferred devices according to the invention, the build surface is a horizontal, continuous and/or open conveyor belt, or it is designed as a rotating platform or a step conveyor.

The build surface—and thus, in particular, the model or component—is preferably conveyable with its first and second ends essentially at the same speed and with the same feed.

A particularly preferred device is characterized in that the deviation in the feed between the first and second ends of the building platform is less than 1 mm, preferably less than 0.5 mm, most preferably 0.3 mm.

Preferred devices according to the invention may be characterized in that the conveyor belt rests and runs on continuous and/or lateral rollers.

A device according to the invention may furthermore be characterized in that the conveyor belt has at least one central support, the support preferably comprising air cushions and/or friction bearings and/or rollers and/or ball casters.

The conveyor belt may have individual links, preferably connected by hinges, the links having gripping elements which are driven by worm gear or guide mechanisms.

The gripping elements may be gripped and positioned with the aid of horizontally positionable or oscillating or rotating grippers and/or barbed hooks and/or magnets and/or vacuum grippers.

One area of the conveyor belt may be transported on a liftable base by means of frictional engagement or cohesion of solid bodies.

The conveyor belt is preferably driven by at least one continuous roller or on both sides by at least two lateral rollers.

In another preferred device, one area of the conveyor belt is transported by means of magnetic fields.

It is also possible for the building platforms of the device to be automotively driven, preferably on overhead rails or free-moving.

The hinges contained in the device preferably have only limited mobility perpendicularly to the conveyance direction.

Roller tracks are preferably added to the device.

The device according to the invention is particularly preferably characterized in that a horizontal, movable build surface for applying build material is provided, and a build space is disposed around it, on which at least one dosing device for particulate material and a solidification unit for particulate material are mounted via linear guides, and the horizontal build surface [is provided] in a Z direction, i.e., at a certain angle to the transport device which is smaller than the angle of repose of the build material. The angle is preferably <30 degrees.

Another aspect of the invention is a device referred to as a "cone printer" for building components. Its functionality is apparent, in particular, from FIGS. 10a through 10c.

A cone printer in the sense of the invention is able to build components on a building platform in a rotating and outwardly directed motion from the inside to the outside by layering particulate material.

The production of components takes place according to the 3D method, i.e., a layer of particulate material is applied in the first step, and a selective solidification of the particulate material takes place in the second step in the known manner. The application of particulate material takes place continuously, a coater (1) completing a circular path for layering the particulate material. The solidification unit (2) follows this path of the coater (1) and ensures the selective solidification of the particulate material and thus the production of components.

A plurality of components may be advantageously produced on one building platform simultaneously or in batches.

The building platform may be selected in dimensions that allow heavy components to be produced. This preferred design thus also achieves the object of a distortion-free production of multiple components.

The special advantage of the use of a cone printer lies in the fact that large and heavy components may be produced without distortion, and a plurality of components may be produced with a high degree of precision in batches.

The invention furthermore relates a method for producing three dimensional models in the continuous process, comprising the following steps: a. building the model in layers on a building platform in a first position, a first layer being applied; b. transferring the model from the first position to a second position with the aid of a feed after a layer is built, the building platform, which has a first front end and a second rear end, being transported with the model; c. building another layer on the model on the building platform; d, transferring the model on the building platform to another position; repeating steps a.) through d.), the transfer preferably being carried out by means of a step conveyor, the step conveyor preferably having lifting and thrusting grates.

In the method according to the invention for producing three-dimensional models, the model on the building platform is transferred without distortion from the first position to the second position.

The method according to the invention for producing three-dimensional models is characterized in that the building platform with the model is evenly transferred from the first position to the second position and any further position essentially without deviations in feed between the first and second ends of the building platform.

The deviation in feed between the first and second ends of the building platform from the first position to the second and any further position is preferably less than 1 mm, preferably less than 0.5 mm and most preferably less than 0.3 mm.

When producing large and heavy components, in particular, the requirements of the horizontal transport device of devices for the continuous method are particularly critical in order to achieve a dimensionally accurate and precise reproduction in the component.

It this case, a loosely applied feedstock made of sand or particulate material must be positioned a few micrometers (e.g., 80 µm) with each new layer. The feedstock has only a limited stability and may weigh several tons.

The device according to the invention or the conveyor system according to the invention is preferably characterized by one or all of the following characteristics:
Continuous feed (continuous conveyor)
Vibration-free feed.
High positioning accuracy in the range of just a few micrometers (e.g., 1 µm)
High rigidity in the conveyance direction under high loads (tensile loads up to several tons)
High rigidity in the vertical direction (weight load up to several tons)
Resistance of the supporting surface to contamination with the build material (e.g., abrasive sands/particulate material or aggressive solvents)
Density of the supporting surface in order to prevent runoff of the build material.
No stick-slip effects
Minimal maintenance with almost non-stop operation
Cost-effective construction The present invention advantageously combines the aforementioned characteristics or at least a subcombination thereof and thus provides an advantageous device and a method for building models in layers, the disadvantages of known devices and methods being avoided or at least partially improved.

In particular, with regard to load tolerance and positioning accuracy, the invention provides a superior device and method.

The device according to the invention may be used, for example, to produce casting molds from molding sand, in which the dimensions and thus the weight of the particulate material feedstock are particularly high.

One approach according to the invention lies in the use of link conveyors. Link conveyors whose individual links are connected by special hinges are particularly suitable in this case. The hinges have a stop which results in the fact that the link conveyor is able to bend or roll off from the plane in only one direction (downward in this case). It is rigid in the other direction (upward in this case). A sagging of the link conveyor is prevented thereby, and an even feed with only slight deviations or only slight distortion is achieved.

In one particularly preferred embodiment, this link apron is laid over a roller track and driven by friction engagement. The roller track is an arrangement of multiple rollers or cylinders. One, multiple or all rollers may be driven. If all rollers are driven, an even feed of the link conveyor results. Since the entire build space of the link conveyor is driven, the belt does not undergo any tensile loading. The belt is thus unable to lengthen during operation, and stick-slip effects are ruled out. If the link conveyor has play in the hinges, this does not have any negative effect.

This type of drive also ensures an exact positioning, since the drive takes piece at the point where the plates have already achieved a horizontal alignment. A polygon effect, which occurs in known systems, does not take place in the invention.

The individual rollers or cylinders may be preferably synchronized by means of coupling elements such as toothed belts, driving belts, chains, toothed wheels or worm gears. If the rollers are connected by driving belts, toothed belts or chains, the link conveyor may also rest directly on the driving belts, toothed belts or chains. Particularly wide belts require rigid cylinders or cylinders having a large diameter for support. As the cylinder diameter increases, so does the distance between the individual cylinders. Link aprons having low intrinsic rigidity could sag between the cylinders.

It may thus be reasonable to attach the drive only to the sides of the link conveyor and to separately support the free-hanging links between the side drives.

All rigid supporting surfaces having good sliding properties are suitable as the support. These may be, for example, the following parts:
Roller tracks
Ball tracks
Sliding materials (e.g., plastics, non-ferrous heavy metals)
Air cushions
Hydrodynamic bearing of the individual links
Hydrostatic bearing of the individual links
In principle, it is also possible to equip each of the links with rollers or ball casters.

To improve the static friction, the rollers may also be pressed onto the driving rollers with the aid of lateral rollers. The rollers may also be designed as toothed wheels. In this case, the individual links also have a tooth profile with which the driving wheels may engage.

If a link conveyor is used, it is also possible to equip the underside of individual or all links with a round driving element, for example. The driving element is then gripped with the aid of a worm gear or a guide wheel and advanced by the necessary layer thickness.

If the individual links are equipped with a driving element, it is also possible to use a reversing linear drive, which repeatedly grips and positions the driving element by means of a gripper. This device may be provided with a particularly rigid design using simple means.

In principle, a spring-supported barbed hook may also be used instead of an active gripper, similarly to a one-way bearing.

Switchable vacuum grippers or magnets or hook-and-loop fasteners are also suitable. They may also be inserted in such a way that they engage with the belt in a rotating or oscillating manner. A preferred position would then be within the chain.

A particularly preferred embodiment of the invention lies in the use of a discontinuous conveyor line with the aid of a step conveyor. The transported material is moved along the entire length in discrete steps. One preferred form of a conveyor mechanism of this type includes a lever system in the form of a four-bar linkage, which is driven in a rotary motion at one of the linkage points. A rigid supporting surface is situated on the side at a distance from the lever mechanism. The movement sequence begins with the resting position of the transported material on the supporting surface. When the four-bar linkage rotates, a lever of the device will receive the load of the transported material, lift the transported material and place it back down on the supporting surface after a discrete distance has passed. The transported material must travel a horizontal distance on the supporting surface before the process starts over.

In the sense of the invention, "step conveyer" is to be understood as follows: a model or component is built in layers and transferred from a first position to a second position with the aid of a step conveyor device, this process continuing or being repeated in steps, and the component thus being subjected to step-by-step layering. It is possible that the process takes place in a longitudinal direction. Alternatively, the step conveyor device or the method may be designed in such a way that a repetition of the transfer from position 1 to position 2 and then back to position 1, etc., takes place. According to the invention, the step conveyor may be used to transfer the components, which have a weight of several hundred kilograms to several hundred tons, without distortion. The feed of each transfer may be from several centimeters to several meters, depending on the device and the method of the layer building method. The feed or transfer speed may be 0.5 to 20 m/min. or 0.1 to 15 minutes per cycle. The step conveyor may have a fixed frame, including guide rollers, a mobile frame on lifting rollers and a drive. The drive may have a mechanical, pneumatic or hydraulic design for the purpose of achieving the feed or the lift. For example, the mobile frame is lowered at the start position and the building plate with the model to be constructed is lowered onto the fixed frame with the aid of, e.g., hydraulics (a first position) and moved forward in one direction in order to be lowered again after the transfer (a second position). This procedure may then be repeated cyclically. The building plate is lifted and lowered again at the start and end of the direction of movement. The transfer process may be controlled from a central unit, e.g., a computer, and be coordinated with the other components and work steps for layering the component, such as application of layers and selective solidification or selective application.

The advantages of an approach of this type lie in a simple structure of the conveyor system, the ability to support and to move the transported material over the entire length. In addition, the structure may be designed to be extremely resistant to sagging due to loading by the weight of the transported material.

If multiple lever systems of this type are built next to each other, loads of greater width may also be reliably conveyed. The only requirement for the transported material: it must be stiff enough to bridge the distance between the lever systems in a freely supported manner. Flexible or fragile transported materials may also be transported with the aid of carrier systems such as palettes. If the transported material is to be moved horizontally without any vertical movement, the lever system may be equipped with linear actuators instead of the rotatory drive. In other words, the transported material again rests on a lever. Another lever moves against the transported material perpendicularly to the conveyance direction. The first lever is then lowered, and the second lever receives the load and shifts it by a discrete length in the direction of conveyance. The first lever then is raised again against the transported material and receives the load, while the second lever is lowered in order to move back into the initial position. To distribute the weight load better, a lever system of this type may comprise multiple levers situated side by side, which mesh with each other like two grates. Since the levers should have a certain distance from each other for reasons of reduced friction, a coverage must take place over the gaps between the levers if the transported material has small components, as in this case. This may be achieved, for example, by laying down a foil. If the transported material is a high-density particulate material, as in the present case, the foil must only be tensile, since the force of the weight is sufficient to hold the foil in position. The foil may be guided continuously over the device in the form of a belt as well as at the two ends of the device with the aid of foil rolling and unrolling mechanisms.

In another preferred embodiment, the sealing takes place via a link apron, which is guided over the lever mechanism.

A lift/thrust device made of two liftable grates has proven to be particularly advantageous for transporting a link apron or a conveyor belt.

A grate is assembled from parallel plates or rods which are oriented in the feed direction.

At least two grates engage with each other in such a way that each grate is positioned vertically and is able to carry the link apron. At least one of the two grates must be positioned in such a way that it may be moved in the feed direction.

During the building process, both grates are extended all the way with the aid of linear actuators (e.g., pneumatic cylinders, spindles), so that they are situated at the same height and both carry the conveyor belt (link apron). For transporting, one grate moves down, so that the only grate carrying the conveyor belt (link apron) is the one which is able to position it in the feed direction by means of another actuator (thrusting grate). Once the grate has positioned the conveyor belt (link apron) in the thrust direction, the other grate (lifting grate) moves out. When the lifting grate comes to rest, the thrusting grate moves downward again and subsequently returns to its vertical starting position.

In principle, the repositioning of the thrusting grate may also take place in the thrust direction after multiple individual steps, if the traveling distance of the linear actuators permits this. In this case, the thrusting grate is lowered and returned to the starting position only after multiple individual steps have been completed. This procedure may be advantageous for the purpose of reducing positioning errors, e.g., due to the reversing play of the linear actuators.

This system is absolutely rigid with respect to a conveyor belt, and precise positioning may take place simultaneously in both feed directions.

Another advantage of the system lies in its easy scalability, both in the feed direction and also transversely thereto, e.g., by widening the grates or arranging multiple systems in a row.

The structure may preferably have grates, and it is also possible to lift only the thrusting grate or a thrusting platform by a minimal amount. Minimal lifting in this case means lifting the thrusting grate or a thrusting platform only until the force of the weight produces the corresponding frictional engagement between the thrusting grate and the conveyor belt. The thrusting grate or a thrusting platform subsequently positions the conveyor belt horizontally, if the conveyor belt sags transversely to the conveyance direction, it may, under certain circumstances, fail to be fully lifted. The remaining supporting areas are then preferably designed to have good sliding properties. In these areas, air cushions or rollers may be mounted on the link apron itself or on the supporting surface.

Conveyor belts which are driven by means of frictional engagement or a form fit (similarly to a toothed belt) are also suitable up to a certain width. It would also be possible to incorporate driving elements into a flexible conveyor belt. Electrically conductive windings, which are incorporated into the belt, would also be possible, so that the entire belt is driven by means of self-inductance, similarly to a three-phase motor.

To avoid sagging in particularly wide belts, intrinsically rigid inserts may be incorporated transversely to the feed direction.

Another option according to the invention is to apply the particulate material feedstock on individual plates. The plates could be moved with the aid of the same transport systems as for link conveyors (see above). For continuous building, the transportation of the built-upon plates back to the start after unpacking must be ensured. This may be accomplished with the aid of robots or conveyor belts.

However, it is also possible to transport the individual plates on a rail system.

The plates may be supported individually, e.g., on rollers or air cushions, and transported into the system.

For automation, each plate may be equipped with its own intelligent drive. All information on the particular building project may be stored therein, and it may communicate with the building device and the warehouse.

The methods described above may also be used for conveyor belts and link conveyors which are rolled off of and onto rollers. A design of this type advantageously permits uninterrupted operation.

To store as many parts as possible, spiral conveyor belts may also be used, similarly to those in spiral freezers.

In principle, both open and closed belts in the form of foils or sheets may be used to seal link aprons. These sealing belts may be inserted by rollers in an open or closed manner.

Rotating plates, on which the material cone is applied tangentially, are also conceivable.

It would also be possible to produce a truncated cone on a rotating plate. The coater and the tool for selective solidification (e.g., the print head) move axially away from the rotation axis synchronously with the rotary motion of the plate.

In one particularly preferred device or method for producing components by 3D printing, according to the invention, a coater and a solidification unit for selective solidification are combined with a circular building platform (see FIG. 12). The first end and the second end are to be understood in such a way that a process start exists (first end), at which the particulate material application takes place, and a process end exists (second end), at which the component is finished or the finished components are preferably unpacked. The selective solidification may take place in the process with the aid of chemical methods (selective solidification with the aid of a chemical binder) as well as using methods such as selective laser sintering or laser melting (SLS, SLM). The circular building platform may also be combined with devices for the selective application of material, such as Fused Deposition Molding (FDM) and other methods known to those skilled in the art for the selective application of material to predetermined areas.

This preferred device according to the invention or the production method have the further advantage that the components are produced on a single rotating building platform, and the component thus does not change its position on the building platform, whereby the production also takes place without distortion. This is advantageous, in particular, when producing large and heavy components. The method may be carried out in batches or continuously. During continuous operation, a method step of a continuous unpacking operation, using means which are known to those skilled in the art, is combined with other device parts and method steps and coordinated therewith.

DESCRIPTION OF THE FIGURES

In FIG. 4a, the middle of conveyor belt (7) is supported on sliding elements (19) made of, e.g., plastic. In FIG. 4b, the middle of the conveyor belt is carried by air cushions (20).

FIGS. 5a through 5c show a structure according to the invention, comprising a link conveyor (7), which has a gripping element (22) on each link. A gripper, which repeatedly grips and positions a gripping element, passes beneath the link conveyor. The sequence is gripping and positioning (FIG. 5a), opening the gripper (FIG. 5b), returning and regripping a link (FIG. 5c).

FIGS. 8a through 8c show the sequence of the feed system from FIG. 7, from the front and from the side in each case, according to the invention.

FIG. 8a shows the starting position when both lifting grate (26) and thrusting grate (27) carry the conveyor belt. In FIG. 8a, lifting grate (26) has been extended and thrusting grate (27) subsequently lowered.

In FIG. 8b, lifting grate (26) has been lowered so that only thrusting grate (27) carries conveyor belt (7). Thrusting grate (27) then moves conveyor belt (7) into its next position.

Figure 1:
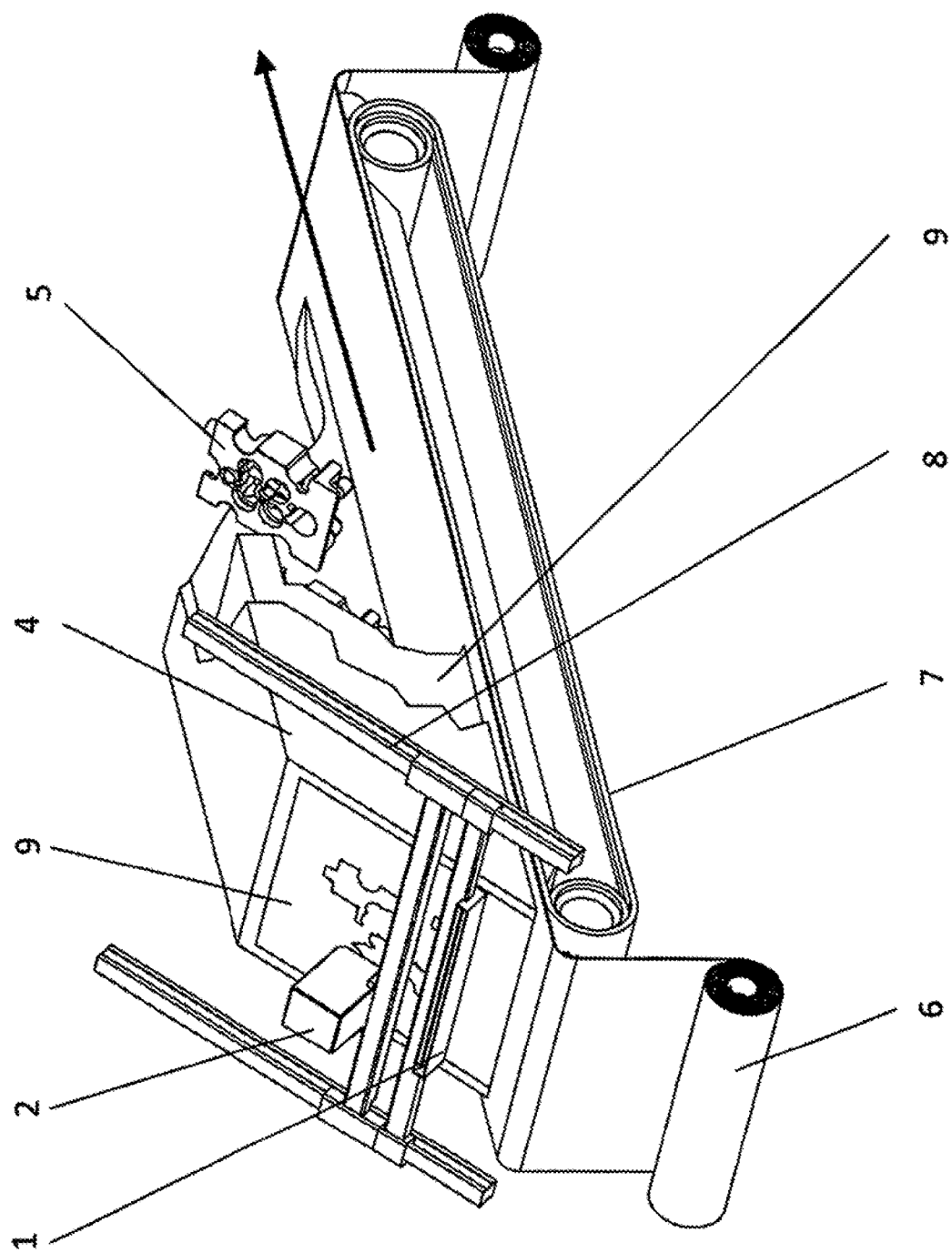
FIG. 1 shows a preferred structure according to the invention, including a closed conveyor belt (e.g., link conveyor) (7) and an open sealing belt (6). The conveyor belt is able to bear the great weight of the particulate material cake while the cover belt is being unrolled and should only prevent the conveyor belt from coming into contact with the particulate material cake. The conveyor belt is unrolled from a roller and rolled up again behind the conveyor belt. The cover belt may be fed by means of frictional engagement on the conveyor belt or by winding up.
Figure 2:
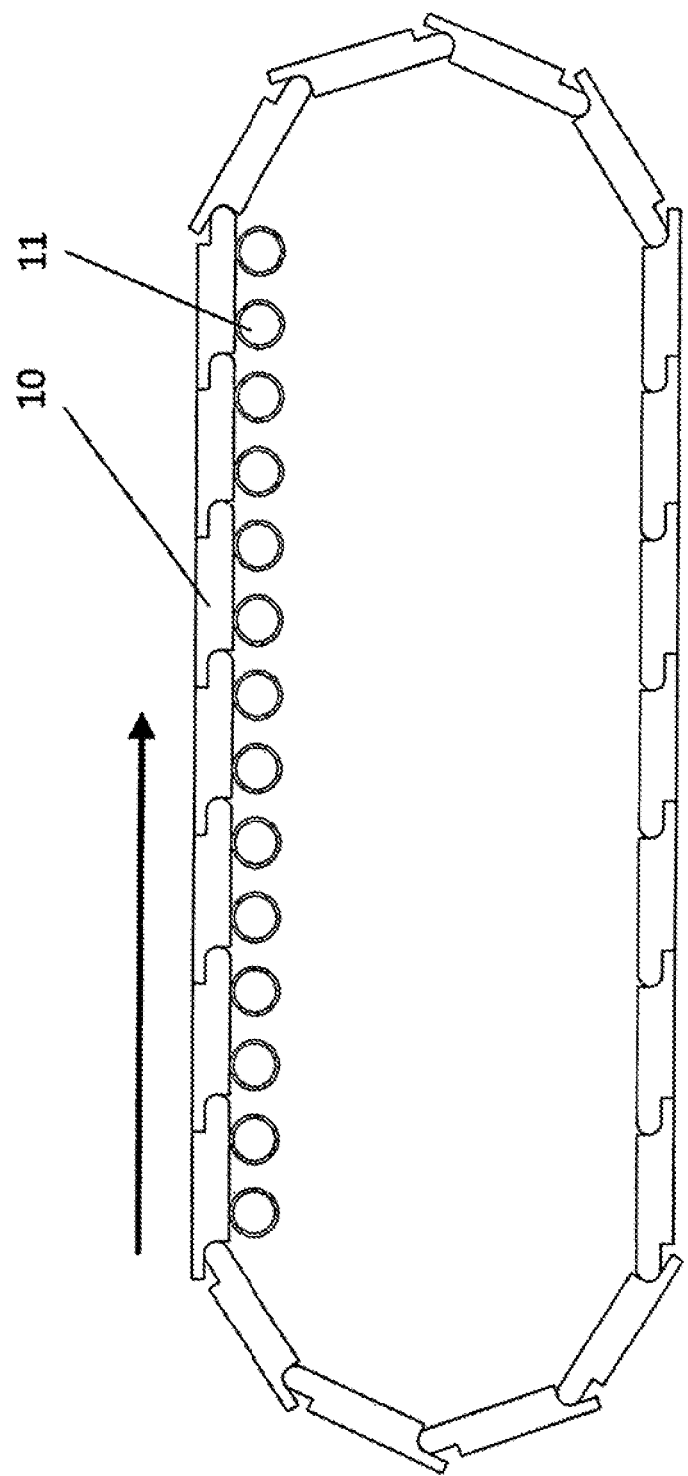
FIG. 2 shows a preferred link conveyor according to the invention, including hinges which permit mobility only in one direction. The link conveyor is moved by a roller track in this case. Only one, multiple or all rollers may be driven.
Figure 3A:
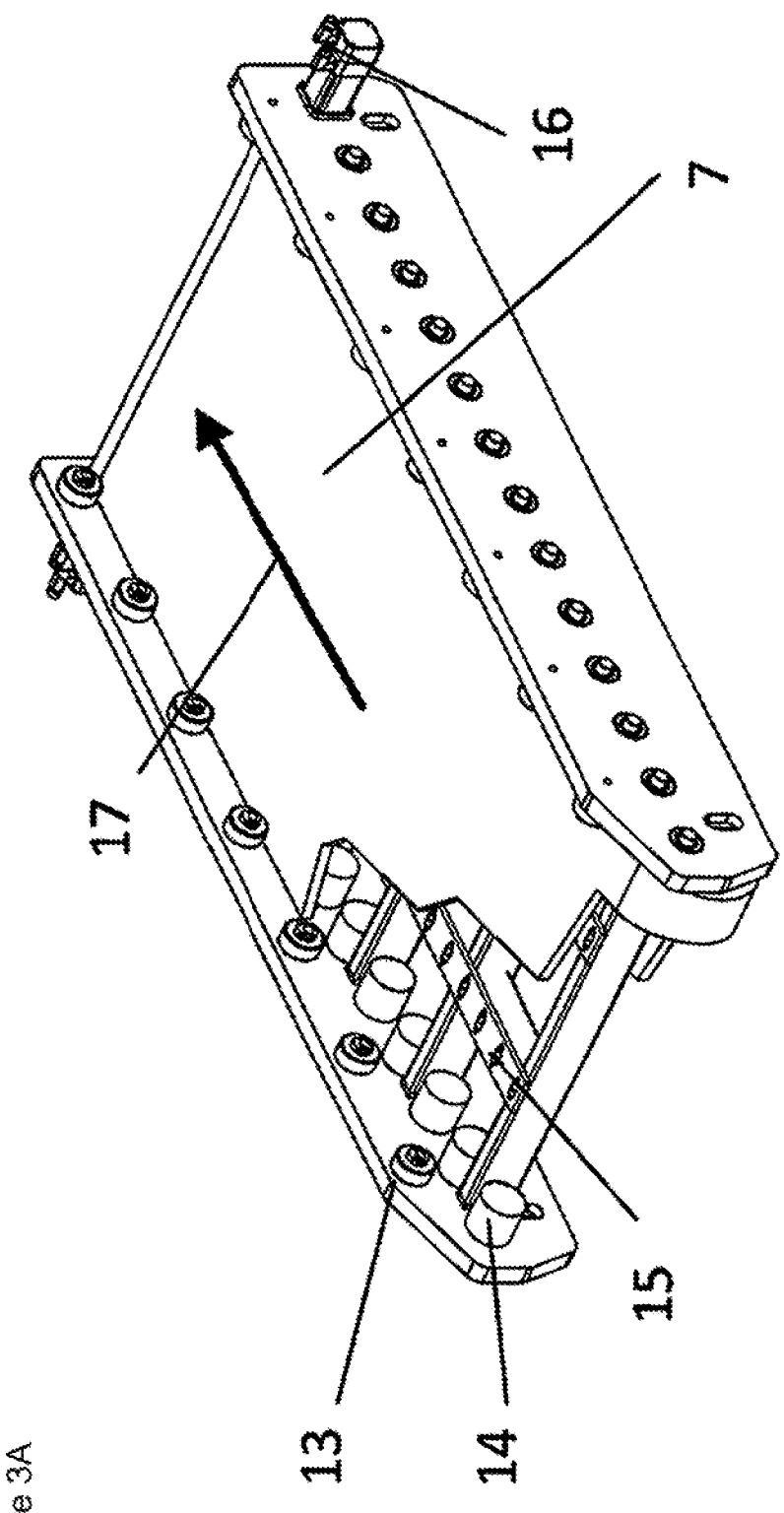
FIG. 3a shows a preferred transport unit according to the invention, comprising conveyor belt (7) (preferably a link conveyor as in FIG. 2), which is driven laterally by driving rollers (14) and is supported on small rollers (15) in the middle.
Figure 3B:
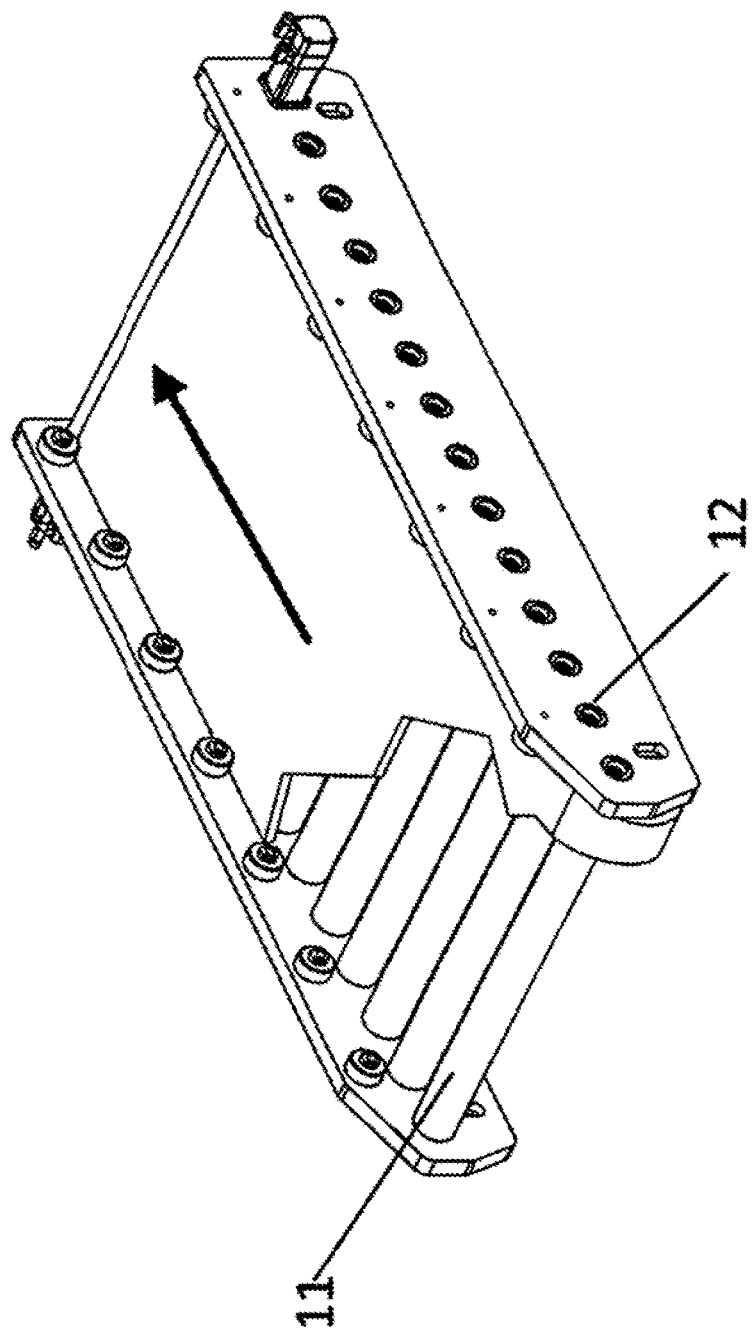
FIG. 3b shows a similar structure, in which conveyor belt (7) rests on continuous driving rollers (17) over its complete width. To achieve a better frictional engagement between the driving rollers (14) or driving cylinders (17) and the conveyor belt (7), pressing rollers (13) press the conveyor belt onto the driving rollers (14) or driving cylinders (17).
Figure 4A:
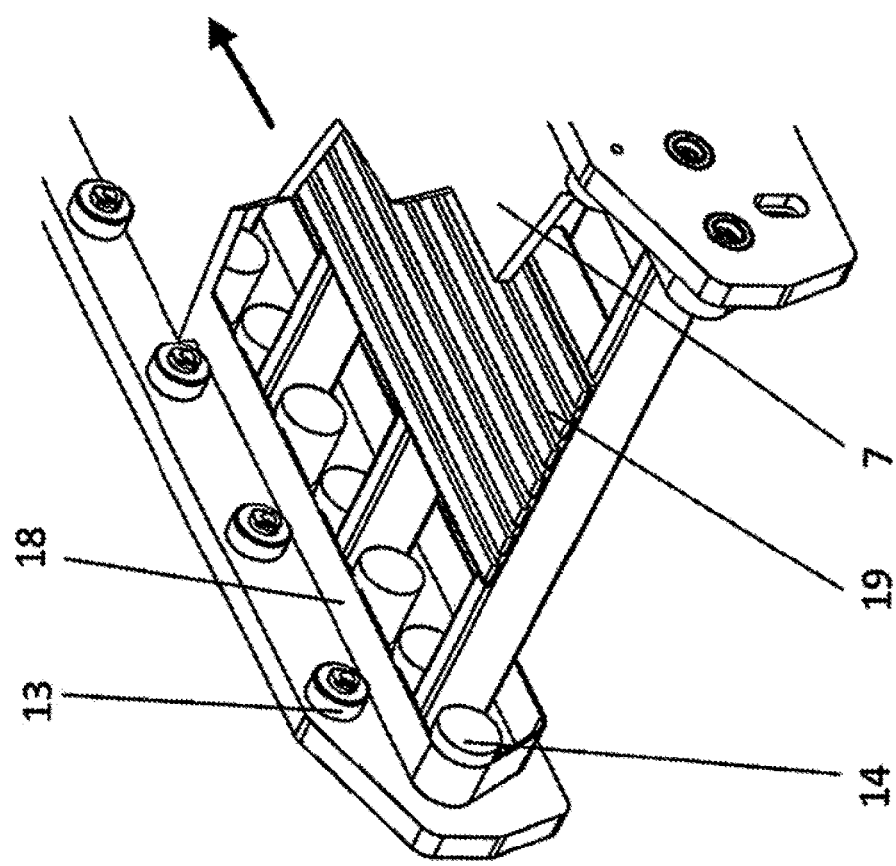
FIGS. 4a and 4b show a preferred structure according to the invention, in which the driving rollers (14) are driven by a shared driving belt (18). Conveyor belt (7) may then rest on the driving belt and be additionally supported.
Figure 4B:
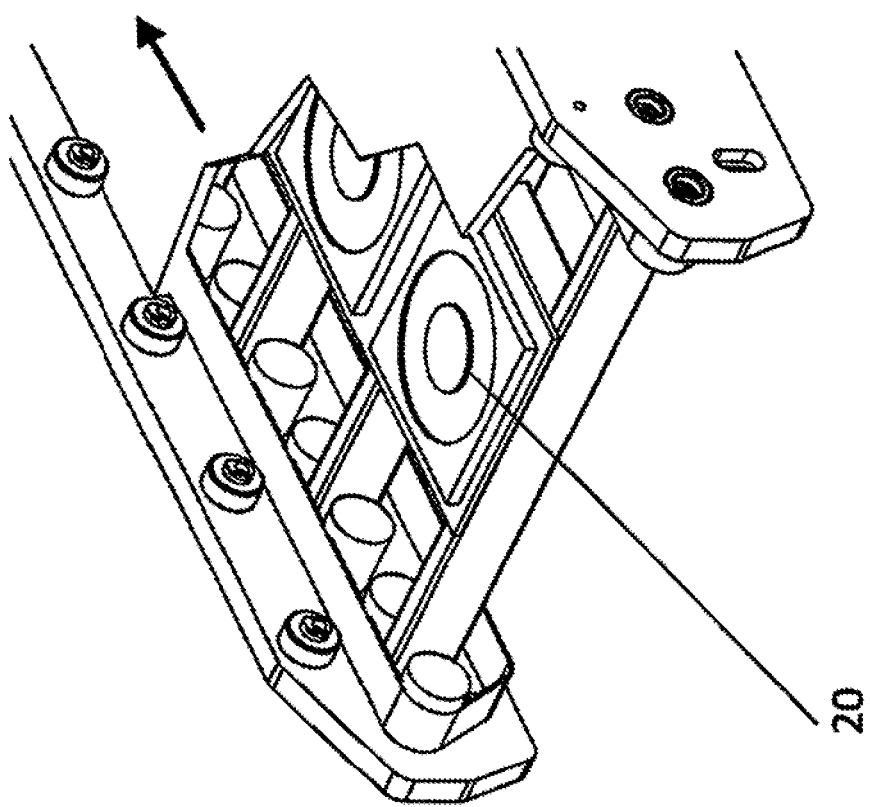
Figure 5A:
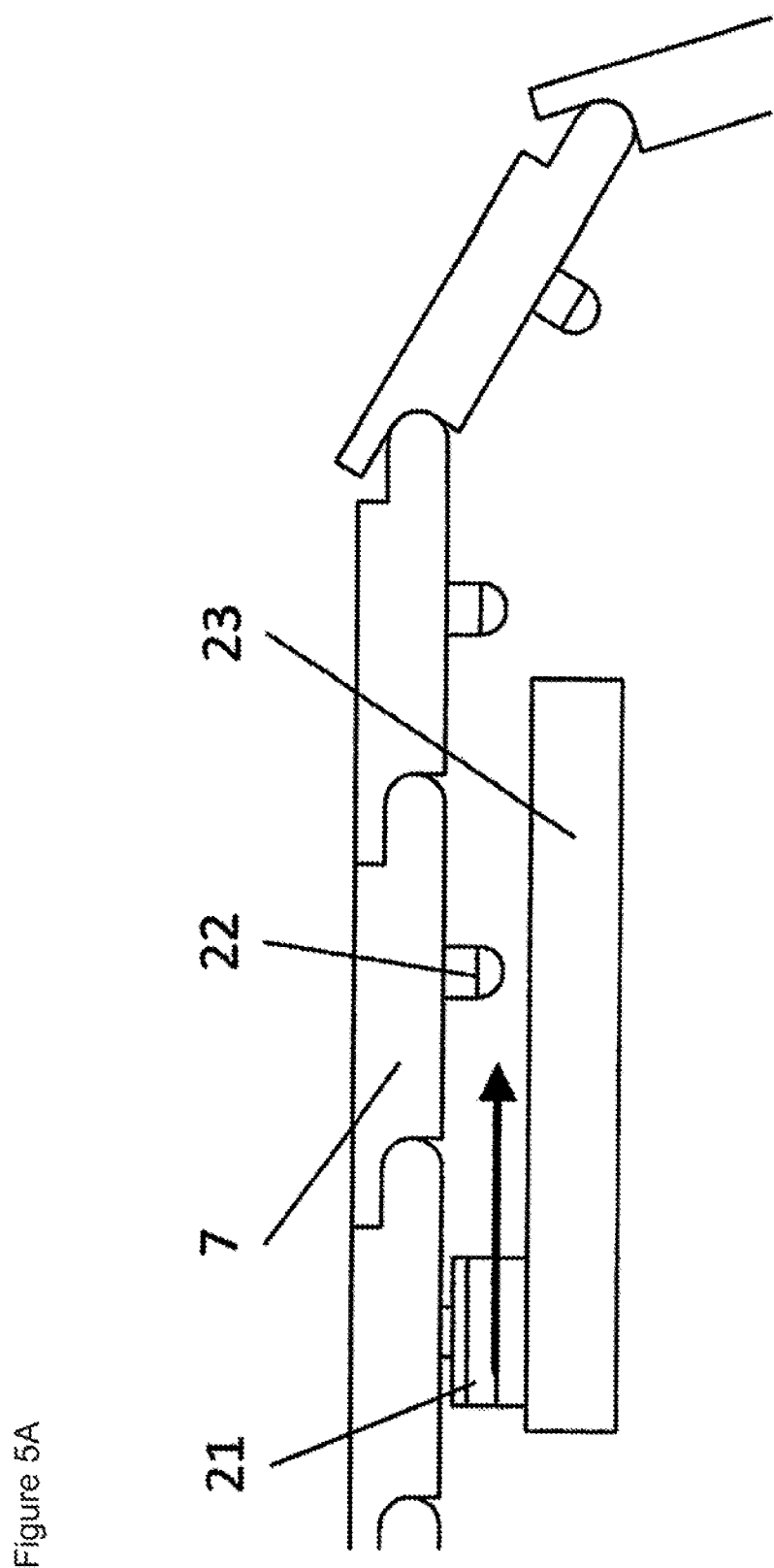
Figure 5C:
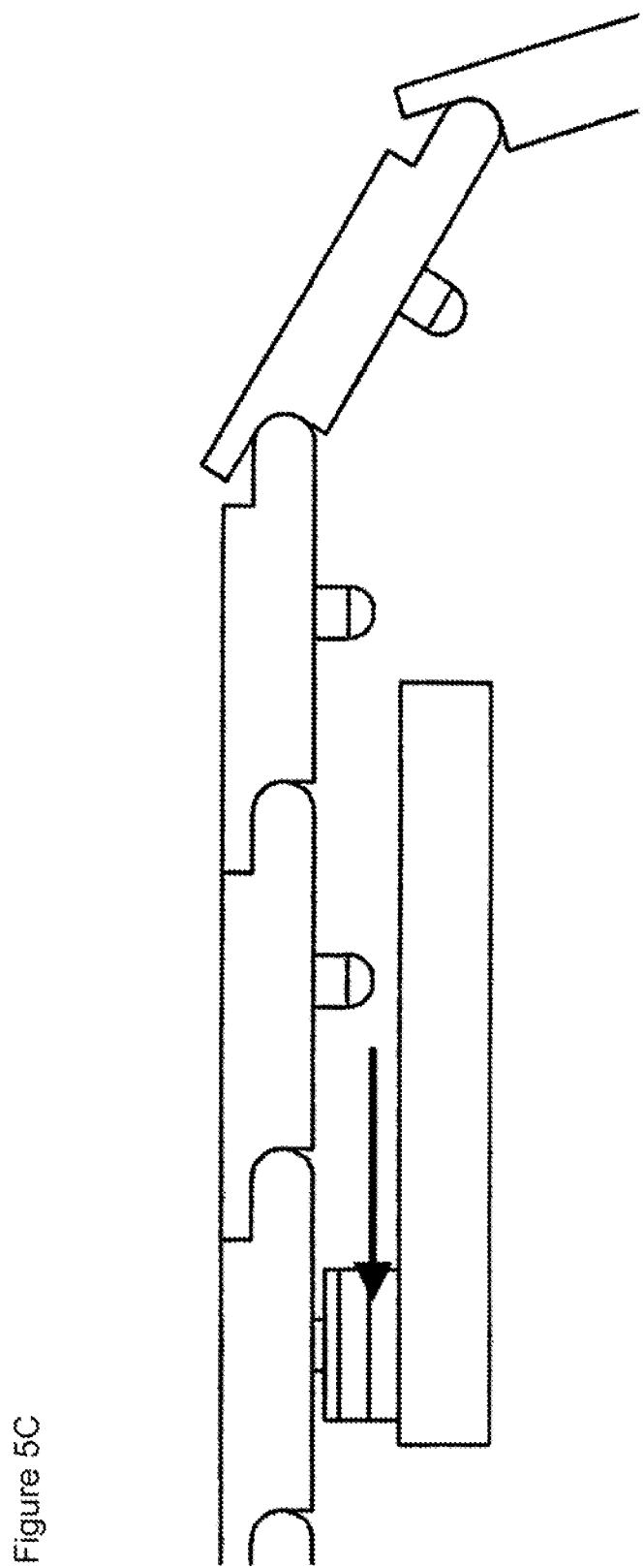
Figure 6:
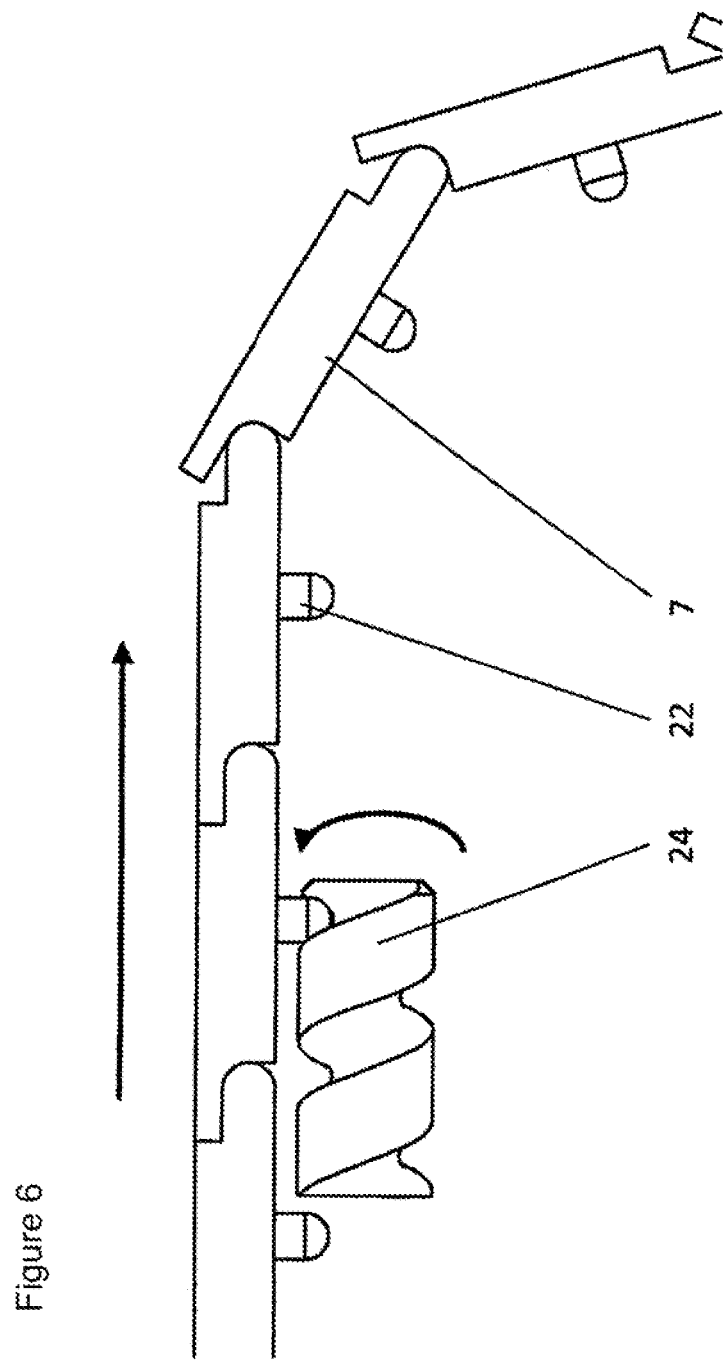
FIG. 6 also shows a structure according to the invention, including a link conveyor (7), which has a gripping element (22) on each link, according to the invention. In this case, gripping elements (22) are positioned by a rotating worm drive (24).
Figure 7:
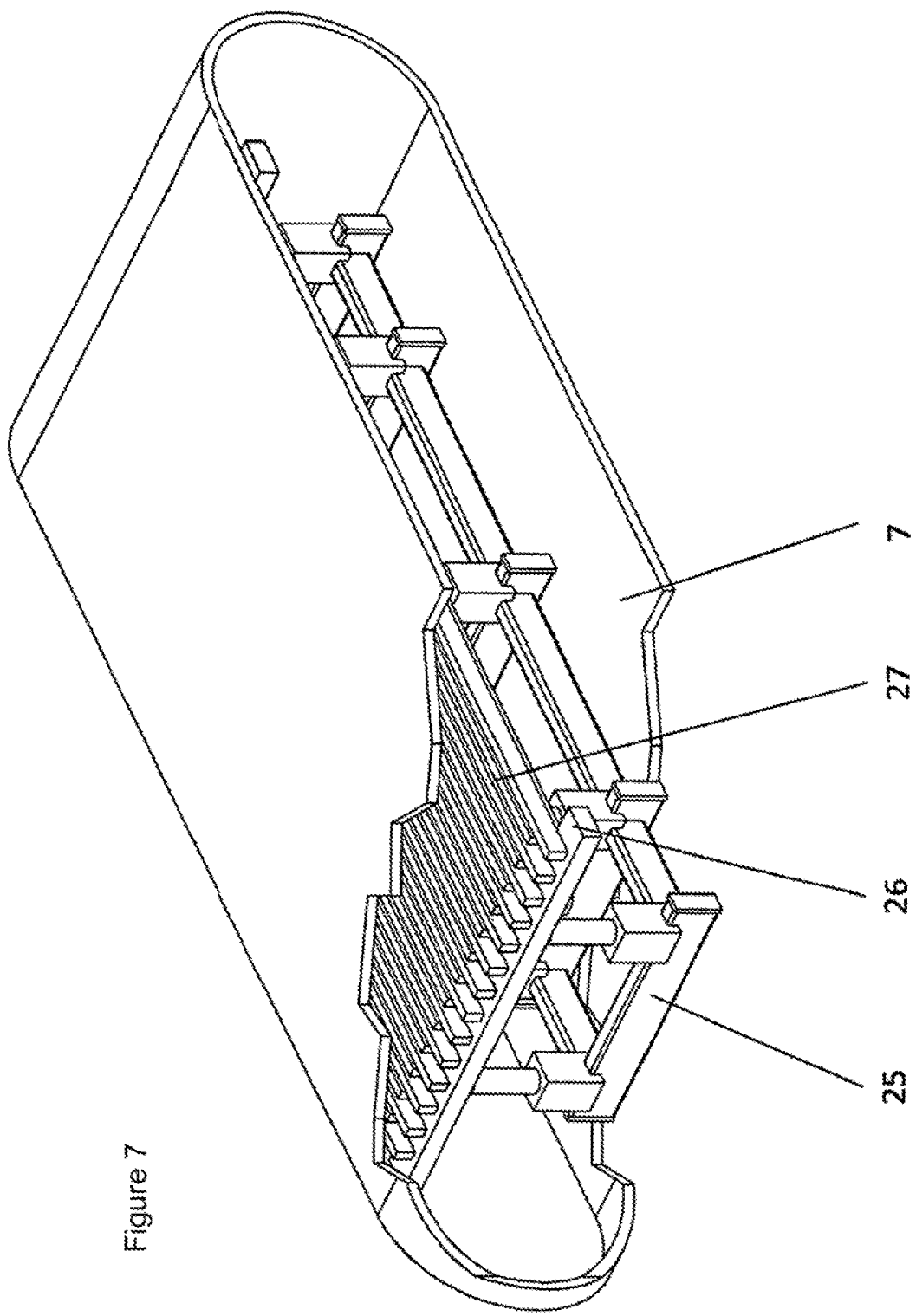
FIG. 7 shows an oblique view of a preferred feed system according to the invention, including raised grates according to the invention.
Figure 8A:
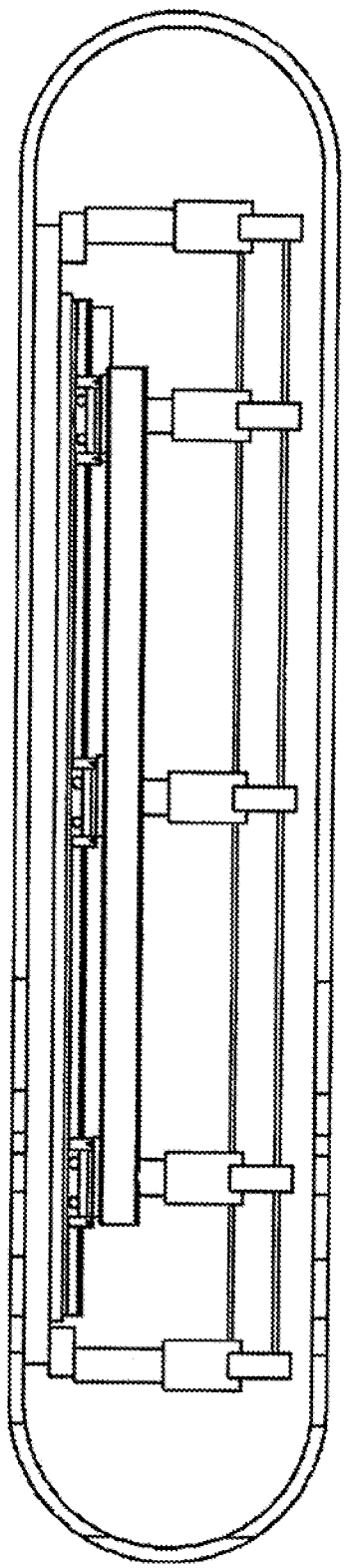
Figure 8A:
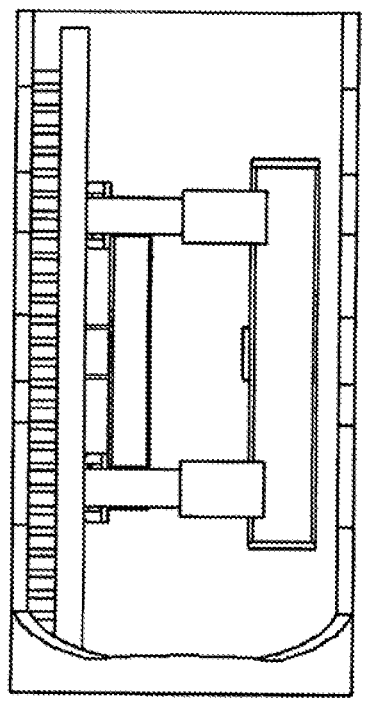
Figure 8C:
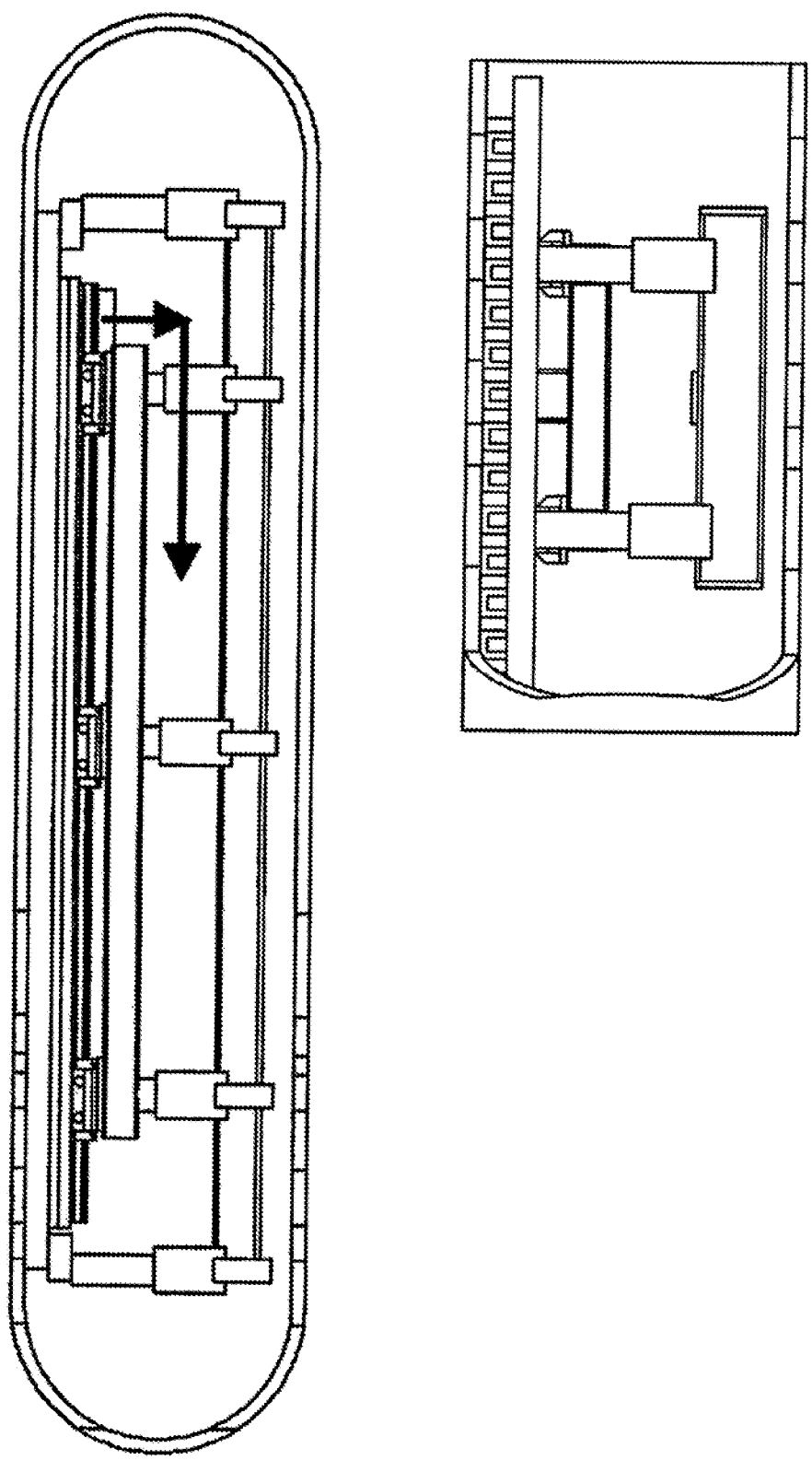

In the lowered state, thrusting grate (27) returns to its starting position, as illustrated in FIG. 8a.

Figure 9:
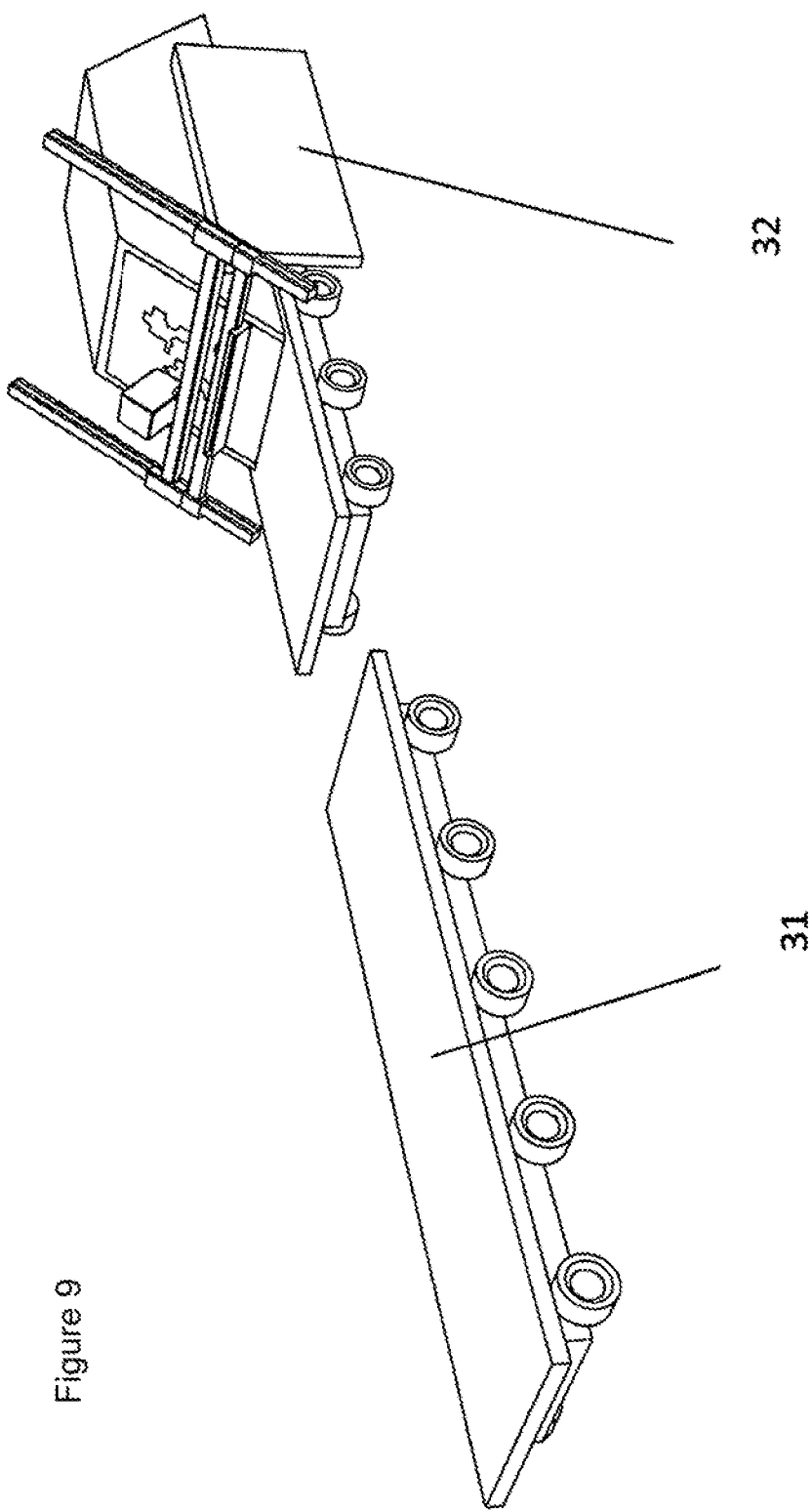

FIG. 9 shows a preferred structure according to the present invention with self-propelled building platforms (31). They are moved into building device (32).

Figure 10A:
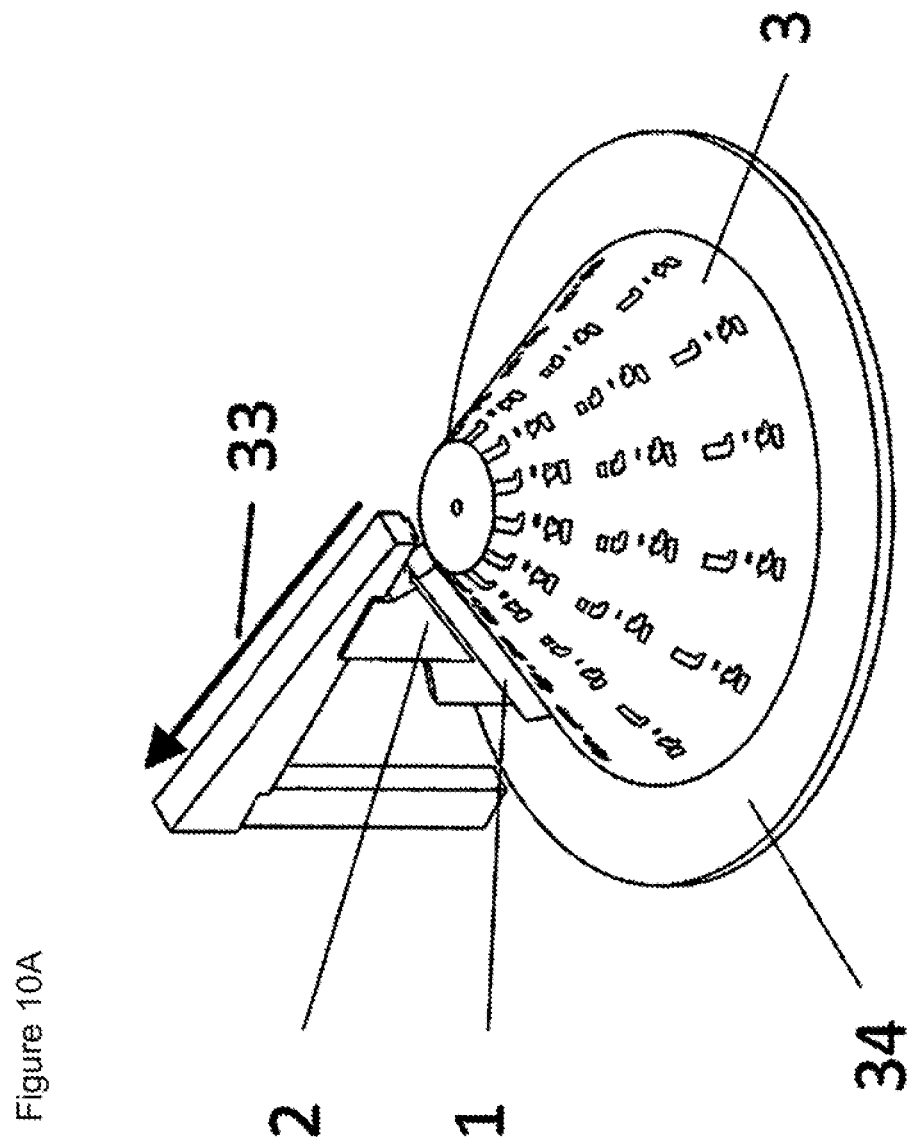
Figure 10B:
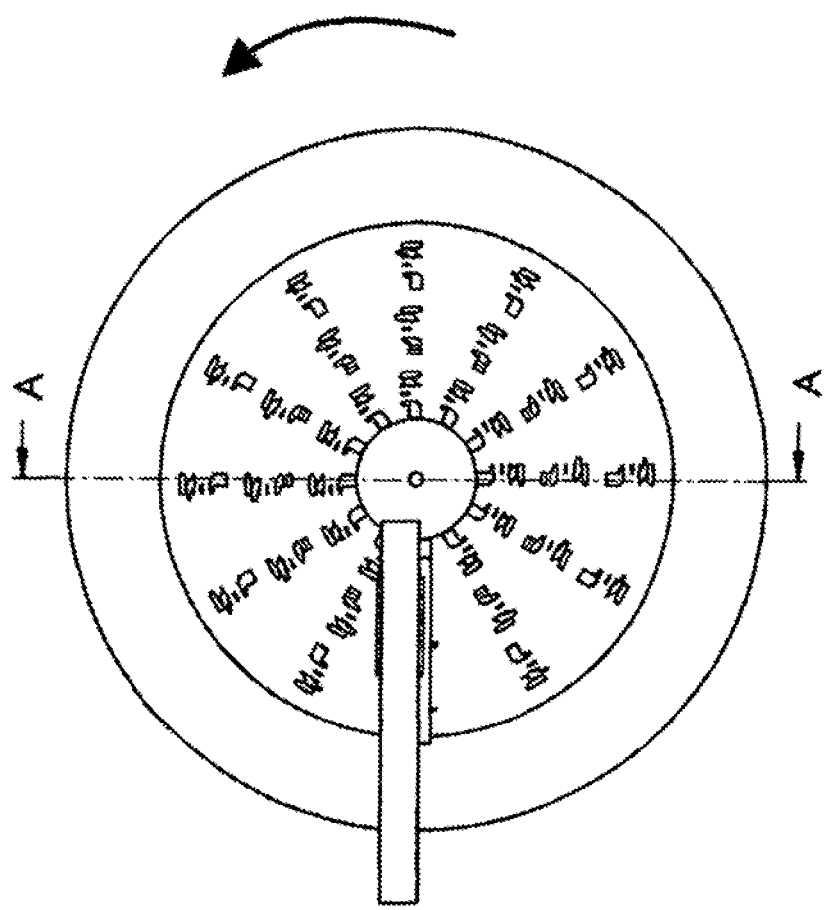

FIGS. 10a through 10c show additional preferred embodiments according to the invention. In this case, the feedstock is not produced linearly but rotatorily. The process begins at a first position or end and ends at a second position or end. FIG. 10b is a view of FIG. 10a from above. FIG. 10c is a side view of FIG. 10b of the cone printer according to the invention, on sectional plane A-A. (33) designates the outwardly oriented movement of coater (1) and solidification unit (2), which is indicated using directional arrows, the method being carried out on building platform (34), and a particulate material feedstock (3) being generated and components [produced], e.g., component (5), following solidification. For this purpose, round building platform (34) is rotated, while coater (1) and the print axis move away from the rotation axis. Coater (1) is rotated 90° with respect to the other preferred devices of the invention described above and may be operated continuously. Solidification unit (2) may also work continuously, whereby a plurality of components may be produced in this manner on one building platform (34) in one operation (batch). A build cone (21) may be used to start the system. The alpha angle may be changed, depending on the particulate material, and thus be optimally adapted to the particular particulate material used. This device type requires the data for the molds for the components to be produced to be skewed not only linearly but also on the basis of polar coordinates. The dimensions of the cone printer and the building platform as well as the device as a whole may be selected in such a way that both very small and very large and heavy components may be produced without distortion.

Figure 11:
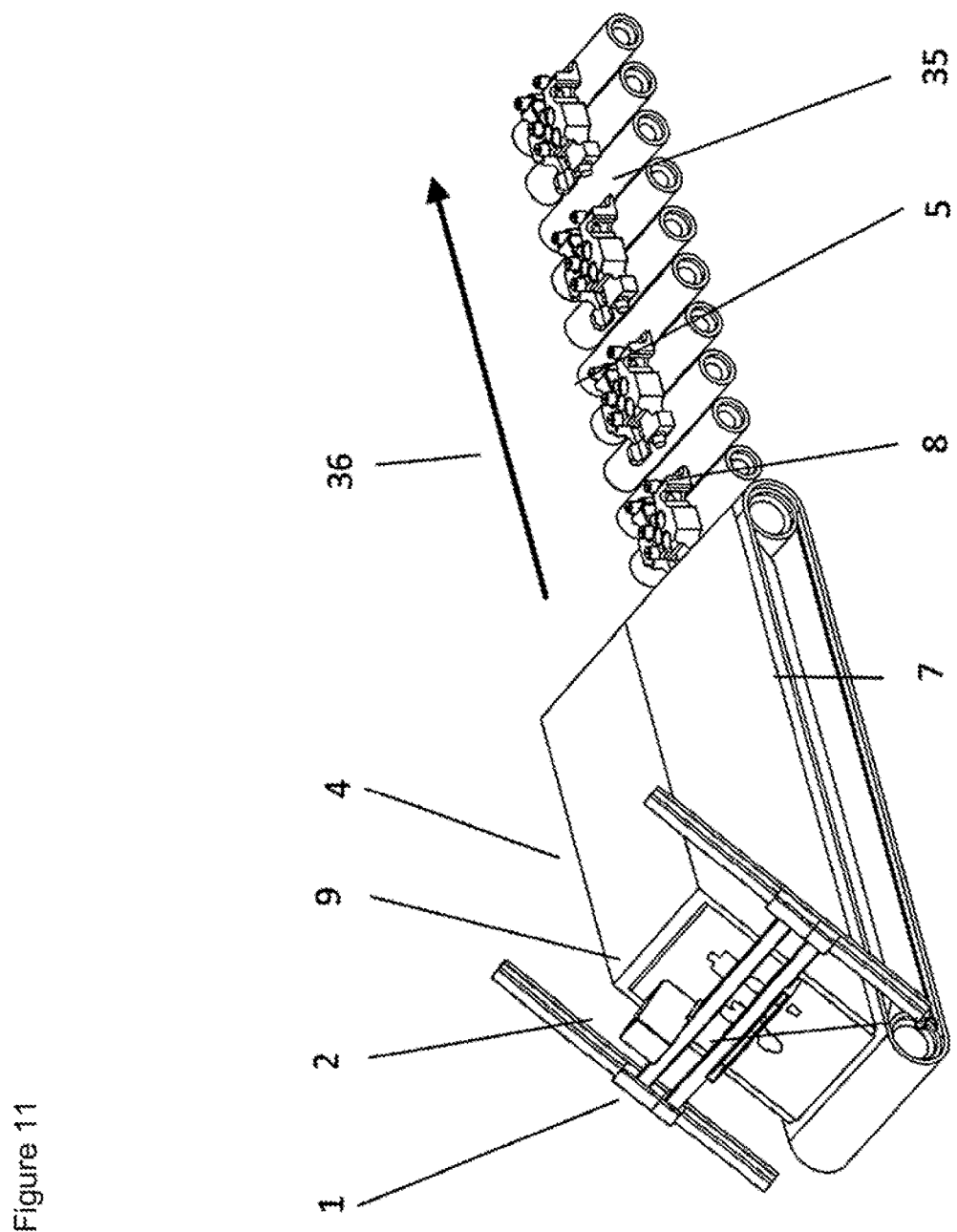

FIG. 11 shows a preferred building device (2) according to the invention, to the end of which an unpacking area, including a roller track (35), is connected. The finished components are deposited directly onto the roller track. Loose particulate material may run off between the rollers and thus support unpacking. The roller track may be driven or it may run passively.

Figure 12:
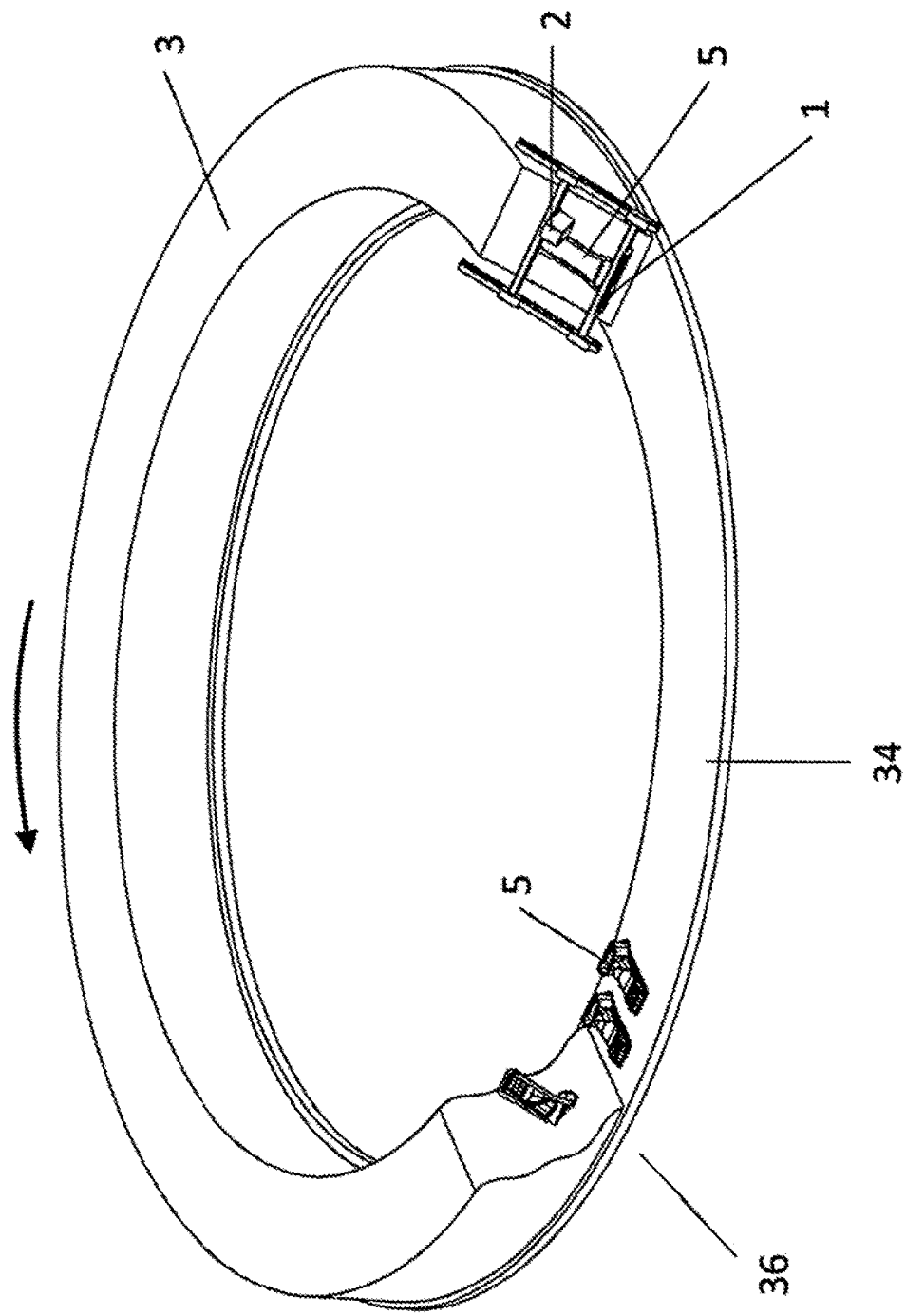
Figure 13B:
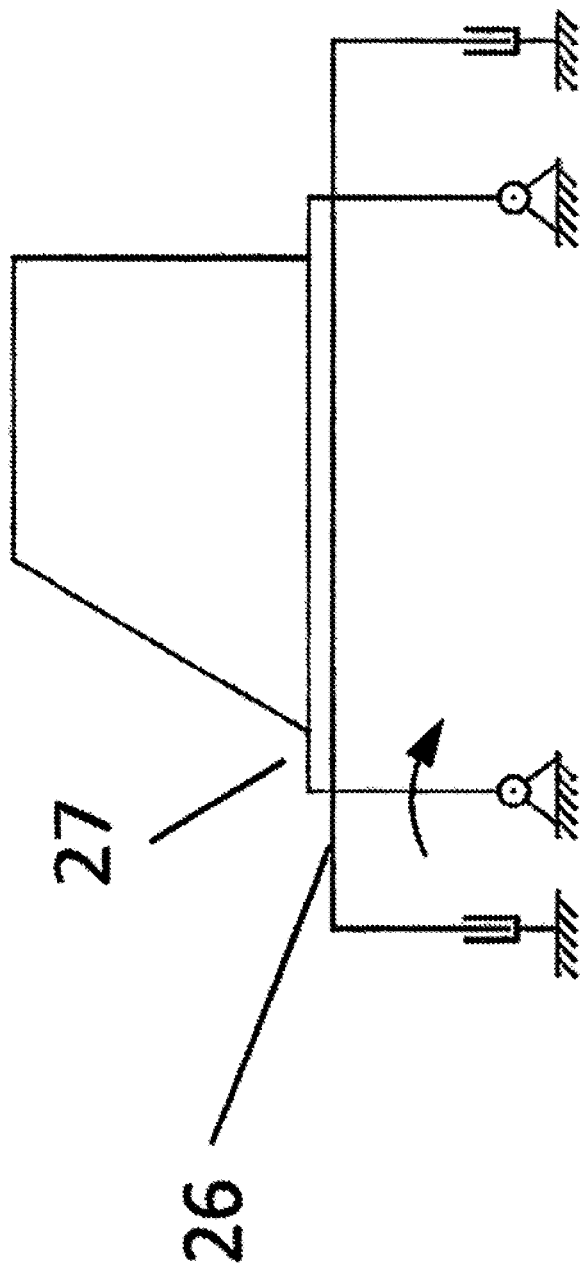
Figure 13C:
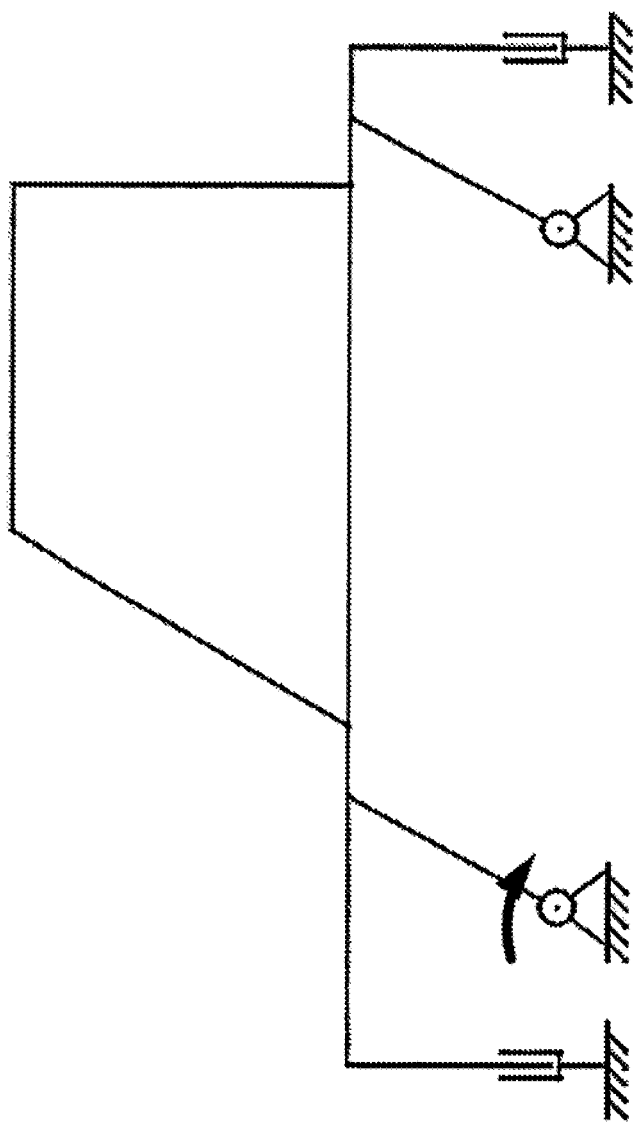
Figure 13D:
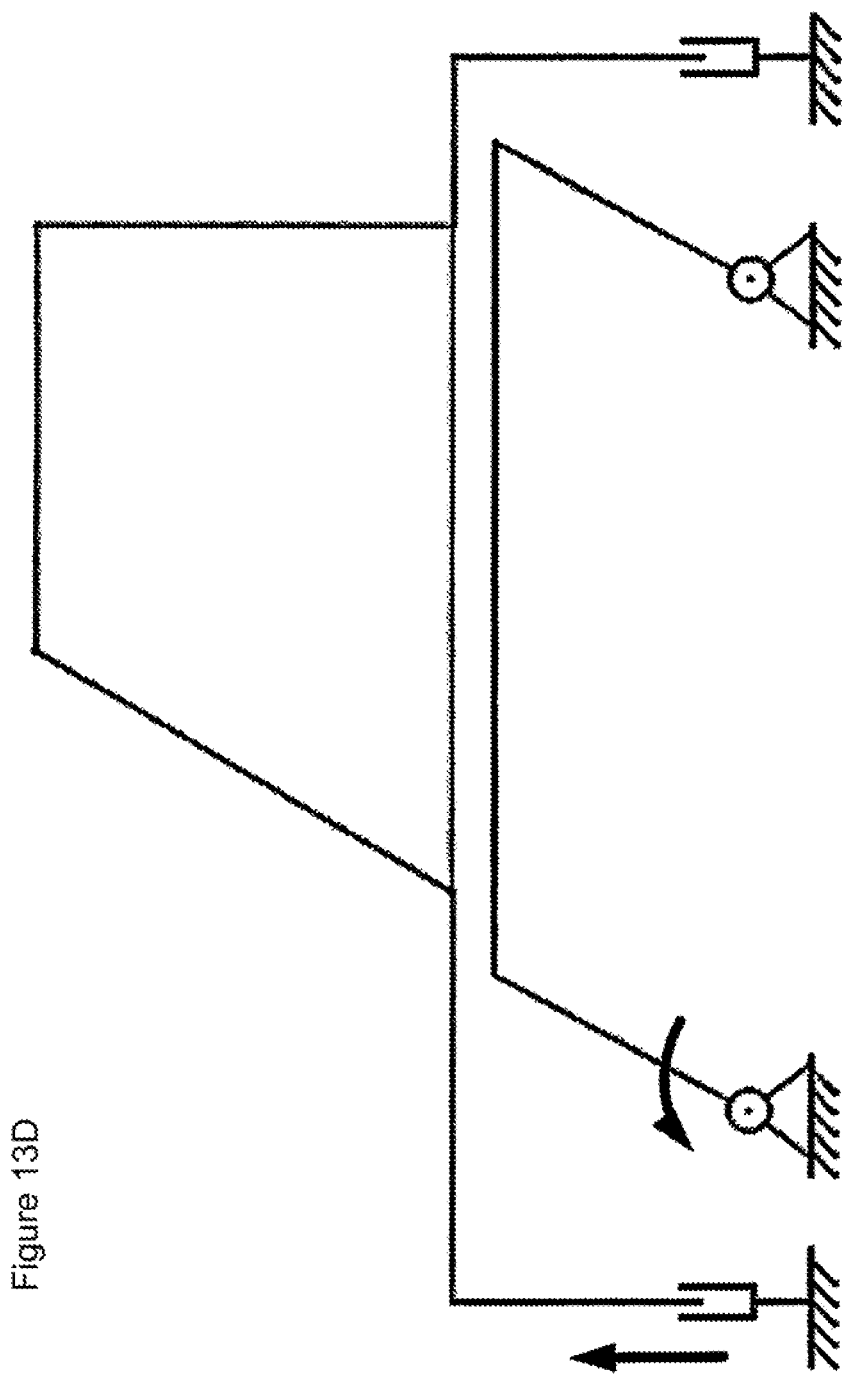
Figure 13E:
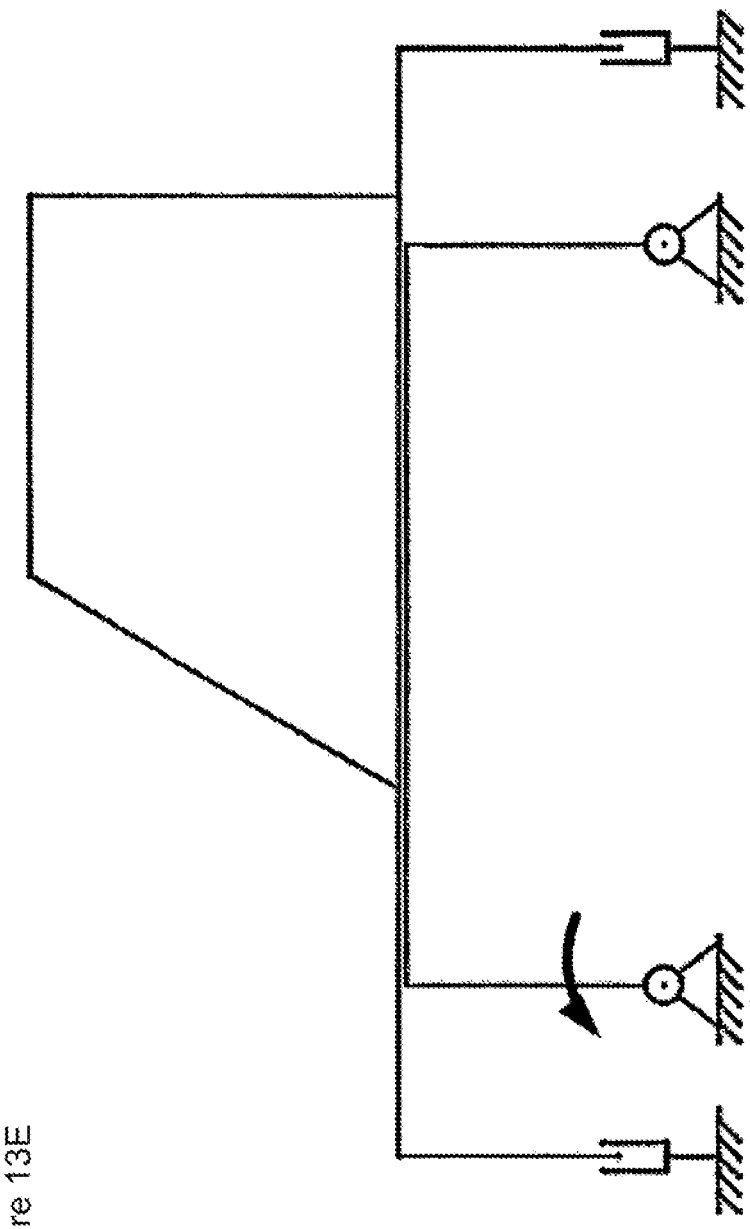
Figure 14A:
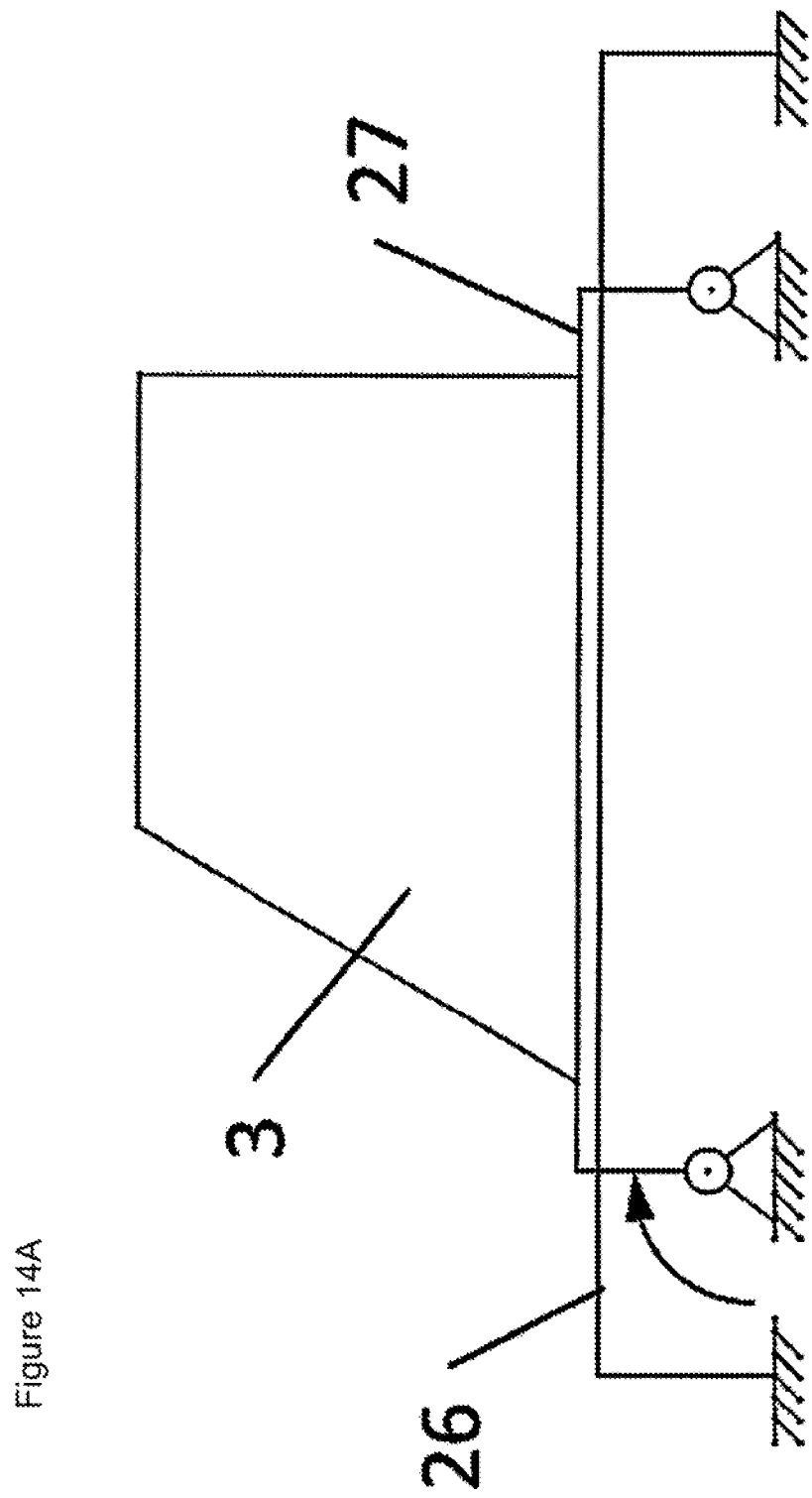
Figure 14C:
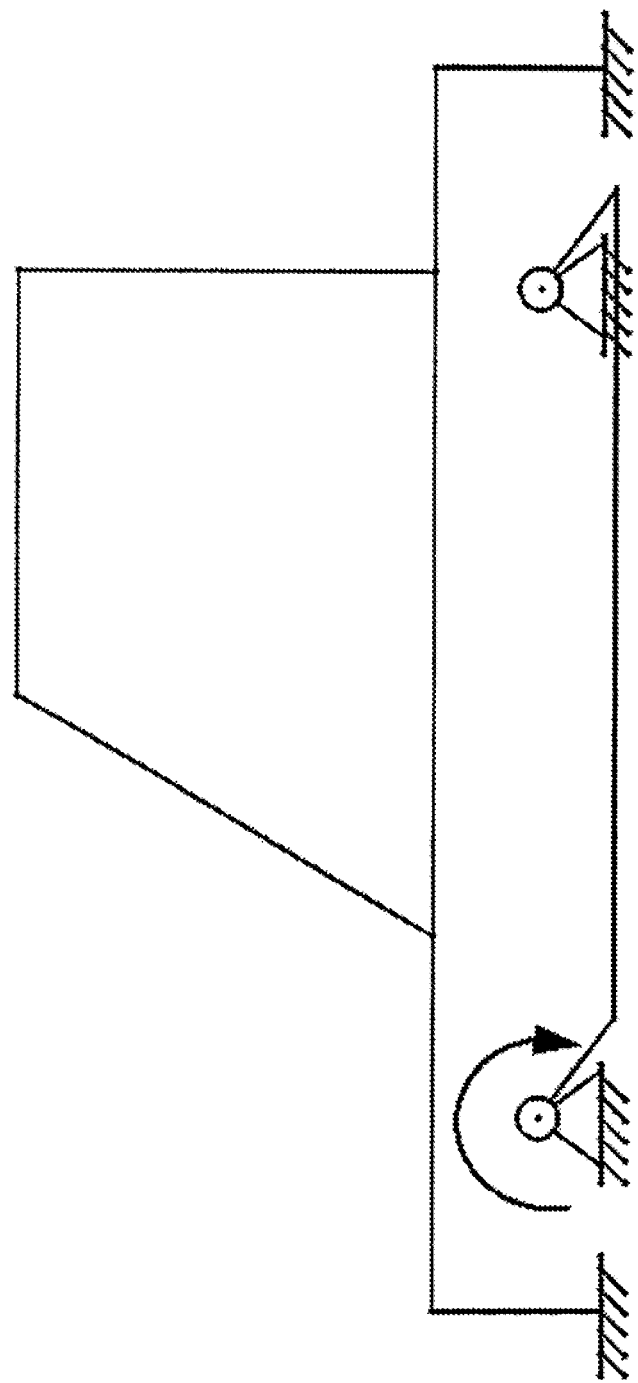
Figure 15A:
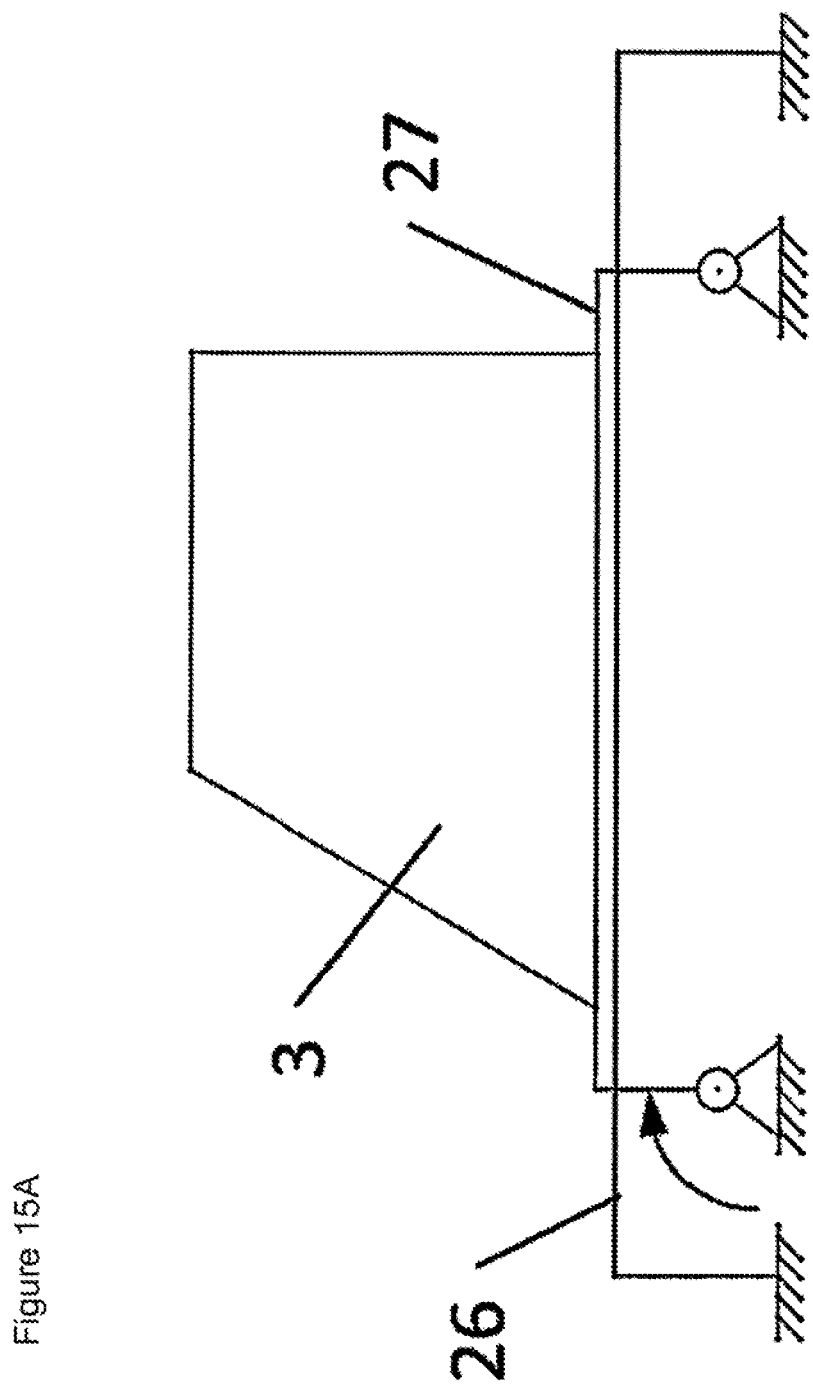
Figure 15B:
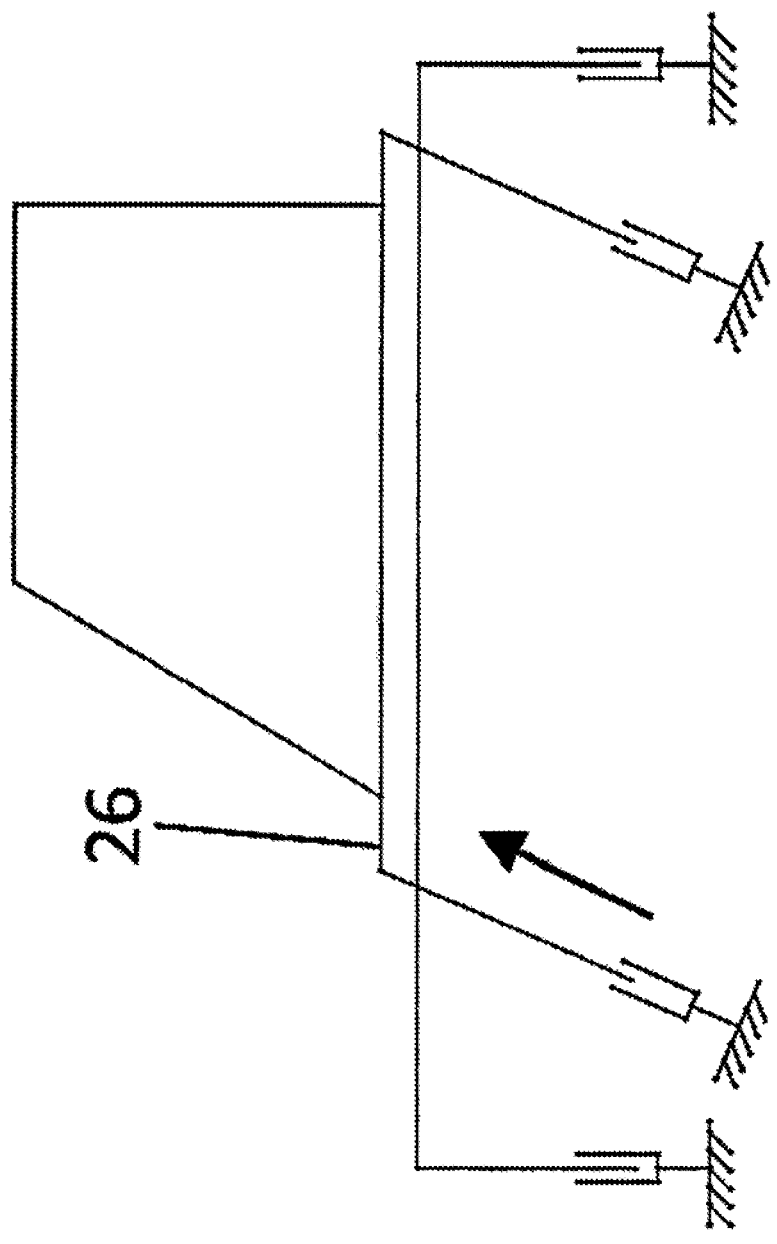
Figure 15C:
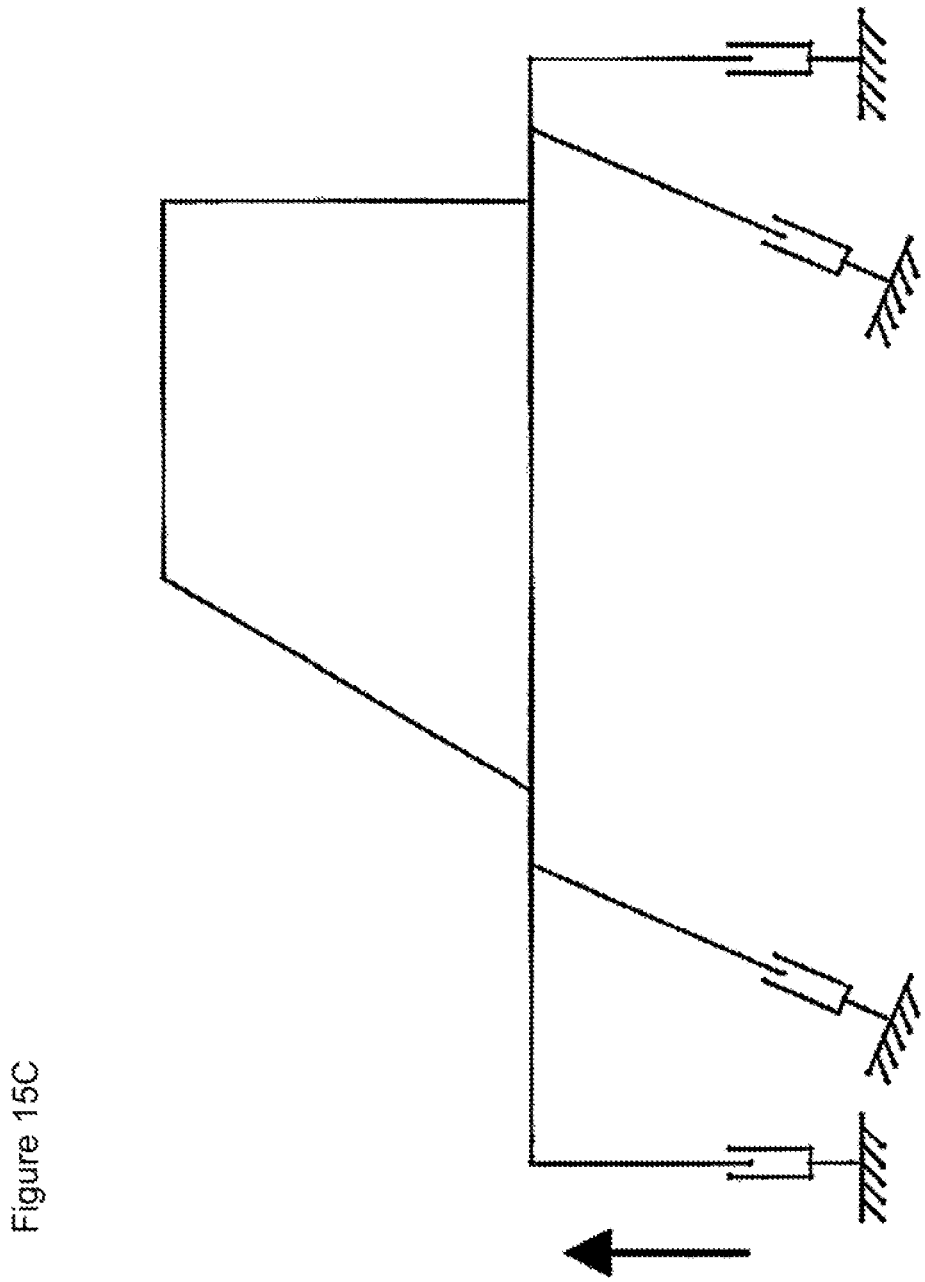
Figure 15D:
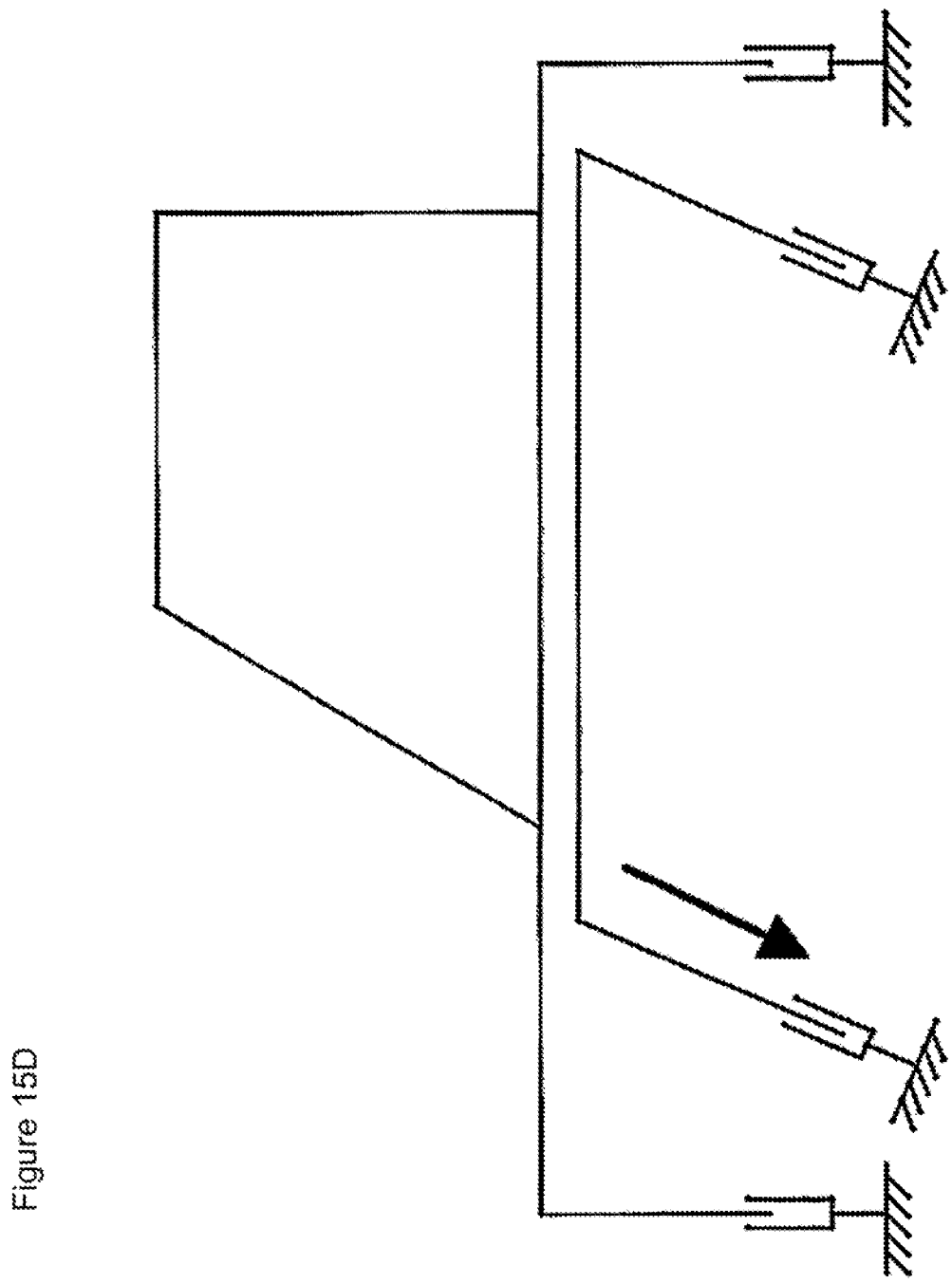

FIG. 12 shows a preferred building device according to the invention with a rotating building platform (34). Coater (1) and solidification unit (2) move only translatorily, while building platform (34) continues to rotate layer by layer and thus continuously builds up material feedstock (3). In another preferred embodiment, the device in FIG. 12 may be configured in such a way that it is combined with an unpacking station or an unpacking operation in an arbitrary position. Finished components (5) are shifted to a position (36) inside or outside or below or above building platform (34) and freed of the remaining loose particulate material simultaneously or in another work step. The process begins at a first position or end, e.g., at the point of the first particulate material application, and ends at a second position or end, e.g., upon completion of the component or preferably at the point of unpacking. The loose particulate material may be resupplied cyclically to the further continuous process. The particulate material supply is thus limited to the quantities which are removed from circulation in the form of components and any non-reusable quantities.

FIGS. 13a through 13f show a drive for belts or link aprons with lifting grates (26) and thrusting grates (27) according to the principle of the step conveyor. Thrusting grate (27) moves on lever arms which swivel back and forth. Lifting grate (26) is raised on the return swiveling motion.

FIGS. 14a through 14d show a drive for belts or link aprons with lifting grates (26) and thrusting grates (27) according to the principle of the step conveyor. Thrusting grate (27) moves on rotating lever arms.

FIGS. 15a through 15d show a drive for belts or link aprons with lifting grates (26) and thrusting grates (27) according to the principle of the step conveyor. A vertical lifting of lifting grate (26) alternates with an inclined lifting of thrusting grate (27).

LIST OF REFERENCE NUMERALS

1 Coater
2 Solidification unit
3 Powder cake/particulate material feedstock
4 Tunnel wall
5 Component (being built)
6 Roller for cover belt
7 Conveyor belt (e.g., link conveyor)
8 Linear unit
9 Build space
10 Link with hinge
11 Driving cylinder
12 Cylinder bearing
13 Pressing roller
14 Driving roller
15 Bearing roller
16 Motor
17 Conveyance direction
18 Driving belt (e.g., toothed belt)
19 Sliding element
20 Air cushion
21 Gripper
22 Gripping element
23 Linear feed
24 Worm wheel
25 Frame
26 Lifting grate
27 Thrusting grate
28 Linear bearing
29 Lifting unit for lifting grate
30 Lifting unit for thrusting grate
31 Self-propelled building platform
32 Building device
33 Direction of movement of the coater and the solidification unit
34 Rotating building platform
35 Roller track
36 Unpacking area

What is claimed is:
1. A device for producing three-dimensional models in a continuous process, comprising:
a conveyor;

a build surface that is a portion of the conveyor for supporting a particulate material feedstock;

a drive component for moving the build surface, including at least one lifting support and at least one thrusting support that are both capable of being raised and lowered;

at least one dosing unit positioned above the at least one lifting supports, wherein the dosing unit applies a layer of a particulate material to the particulate material feedstock while the build surface is supported by the at least one lifting support and/or the at least one thrusting support; and and at least one solidification unit;

characterized in that the conveyor is transported by the drive component, wherein the at least one thrusting support provides support to the conveyor while moving the conveyor in a forward direction and the at least one lifting support provides support to the conveyor while the at least one thrusting support returns to a starting position;

wherein each lifting support and each thrusting support is below the build surface.

2. The device of claim 1, wherein the build surface, while conveying the particulate material feedstock, moves at a same speed at a first end and at a second end.

3. The device of claim 2, wherein a deviation in feed between the first and second ends of the building platform is less than 1 mm.

4. The device of claim 1, wherein the conveyor rests and runs on continuous or lateral rollers.

5. The device of claim 1, wherein the build surface is horizontal, the at least one dosing unit for particulate material and one solidification unit for particulate material are mounted by means of linear guides, wherein the particulate material is deposited on a build space having a build angle relative to the build surface, which is smaller than the angle of repose of the build material, wherein the build angle being is <30°.

6. The device of claim 1, wherein the at least one lifting support and the at least one thrusting support provide an upward force that is essentially equal to the gravitational force of the feedstock being supported.

7. The device of claim 1, wherein the conveyor is a link conveyor.

8. The device of claim 7, wherein the link conveyor has at least one middle support including one or more friction reducing components selected from an air cushions, friction bearings, rollers, and ball casters.

9. The device of claim 7, wherein the link conveyor is transported on the thrusting support by means of friction engagement or cohesion of solid bodies.

10. The device of claim 7, wherein the link conveyor is driven by means of at least one continuous roller or, on both sides, by means of at least two lateral rollers.

11. The device of claim 7, wherein the device includes roller tracks for supporting the link conveyor.

12. The device of claim 1, wherein a portion of the conveyor is supported only by the thrusting support with the lifting support being lowered away from the conveyor, while moving the conveyor.

13. The device of claim 12, wherein the conveyor is supported only by the lifting support with the thrusting support being lowered away from the conveyor, while the thrusting support returns to the starting position.

14. The device of claim 13, wherein the lifting support includes a grate.

15. The device of claim 14, wherein the thrusting support includes a grate.

16. The device of claim 15, wherein the conveyor is a link conveyor.

17. The device of claim 16, wherein the build surface is horizontal, the at least one dosing unit for particulate material and one solidification unit for particulate material are mounted by means of linear guides wherein the particulate material is deposited on a build space having a build angle relative to the build surface, which is smaller than the angle of repose of the build material, wherein the build angle being is less than 30°.

18. The device of claim 16, wherein the build surface is a flat surface.

* * * * *